(12) United States Patent
Guile

(10) Patent No.: US 7,566,102 B2
(45) Date of Patent: Jul. 28, 2009

(54) MULTIPLE ROLLER WHEEL

(75) Inventor: Graham Guile, Hallidays Point (AU)

(73) Assignee: Innowheel Pty Ltd., Forster (AU)

( * ) Notice: Subject to any disclaimer, the term of this patent is extended or adjusted under 35 U.S.C. 154(b) by 87 days.

(21) Appl. No.: 11/541,459

(22) Filed: Sep. 29, 2006

(65) Prior Publication Data

US 2007/0096541 A1    May 3, 2007

Related U.S. Application Data

(63) Continuation-in-part of application No. 11/050,083, filed on Feb. 2, 2005, now Pat. No. 7,318,628, which is a continuation-in-part of application No. PCT/AU03/01002, filed on Aug. 7, 2003, and a continuation-in-part of application No. 10/275,530, filed as application No. PCT/AU01/01175 on Sep. 20, 2001, now Pat. No. 6,857,707.

(30) Foreign Application Priority Data

Sep. 21, 2000  (AU) .................... PR0296
Aug. 7, 2002   (AU) .................. 2002950635

(51) Int. Cl.
*B60B 19/00* (2006.01)

(52) U.S. Cl. .................. 301/5.23; 301/5.1

(58) Field of Classification Search .............. 301/5.1, 301/5.23; 16/18 R, 45, 46, 47
See application file for complete search history.

(56) References Cited

U.S. PATENT DOCUMENTS 1,326,679 A    12/1919   MacBeth et al.

(Continued)

FOREIGN PATENT DOCUMENTS

AU    3200168    7/1969

(Continued)

*Primary Examiner*—Russell D Stormer
(74) *Attorney, Agent, or Firm*—Pedersen & Co., PLLC; Ken J. Pedersen; Barbara S. Pedersen

(57) ABSTRACT

A wheel 100 rotatable about a main axis 106*a*, including: (a) a frame 111 including multiple supports 114; (b) a first series 150 of rollers 140 radially spaced from the main axis and aligned with a first plane 160*a* normal to the main axis, the first series of rollers spaced to form a first discontinuous rim; and (c) a second series 152 of rollers radially spaced from the main axis and aligned with a second plane 160*c* normal to the main axis. The second series of rollers are spaced to form a second discontinuous rim. The first and second planes are aligned parallel to and spaced from one another. Each roller 140 is: (i) rotatable about an axis normal 117 to the main axis; (ii) mounted between a pair of the supports 115; and (iii) has a lateral central cross-sectional diameter greater than the diameter of its end portions. When viewed in side elevation, the effective ground contacting surface of each of the rollers of the first series of rollers overlaps with the effective ground contacting surface of at least one diagonally adjacent roller of the second series of rollers so that the wheel is adapted to make effective ground contact through at least two of the rollers at any one time for effective travel in directions having a component parallel to the main axis. The frame is furthermore incapable of flexing sufficiently to permit the rollers from being removed or dislodged from the frame, but capable of flexing sufficiently under high loads to redistribute load stress throughout the frame.

21 Claims, 15 Drawing Sheets

U.S. PATENT DOCUMENTS

| | | | |
|---|---|---|---|
| 3,040,371 A | 6/1962 | Rice et al. | 16/31 R |
| 3,363,735 A * | 1/1968 | Hotchkiss | 193/37 |
| 3,465,843 A * | 9/1969 | Guinot | 180/447 |
| 3,621,961 A * | 11/1971 | Stumpf | 193/37 |
| 3,789,947 A | 2/1974 | Blumrich | 180/6.48 |
| 3,878,927 A * | 4/1975 | Murakami | 193/37 |
| 3,882,885 A | 5/1975 | McCain | 137/344 |
| 3,961,694 A * | 6/1976 | Murakami | 193/37 |
| 4,006,810 A | 2/1977 | Kornylak | |
| 4,223,753 A | 9/1980 | Bradbury | 180/6.2 |
| 4,335,899 A | 6/1982 | Hiscock | 280/259 |
| 4,598,782 A | 7/1986 | Ilon | |
| 4,715,460 A | 12/1987 | Smith | |
| 4,926,952 A | 5/1990 | Farnam | 180/6.5 |
| D309,254 S | 7/1990 | Guile | D8/375 |
| 4,981,203 A | 1/1991 | Kornylak | |
| 5,035,314 A | 7/1991 | Kornylak | 193/37 |
| D318,791 S | 8/1991 | Guile | D8/375 |
| 5,213,176 A | 5/1993 | Oroku et al. | |
| 5,323,867 A | 6/1994 | Griffin et al. | 180/22 |
| 5,404,984 A * | 4/1995 | Hagman | 193/35 MD |
| 5,415,215 A | 5/1995 | Covert | |
| 5,536,074 A | 7/1996 | Hsu et al. | 301/5.301 |
| 6,340,065 B1 | 1/2002 | Harris | |
| 6,357,765 B1 | 3/2002 | Heien | 280/5.26 |
| 6,394,203 B1 | 5/2002 | Harris et al. | |
| 6,619,823 B2 | 9/2003 | Dai | 362/500 |
| 6,796,618 B2 * | 9/2004 | Harris | 301/5.1 |
| 6,857,707 B2 | 2/2005 | Guile | 301/5.23 |
| 2002/0057010 A1 | 5/2002 | Harris | 301/5.23 |

FOREIGN PATENT DOCUMENTS

| | | |
|---|---|---|
| AU | 561 380 B2 | 5/1987 |
| DE | 3702660 | 8/1988 |
| GB | 1408820 | 10/1975 |
| GB | 2242173 | 9/1991 |
| GB | 2424858 | 10/2006 |
| WO | WO 00/12327 | 3/2000 |
| WO | WO0179007 | 10/2001 |
| WO | WO 02/24471 | 3/2002 |
| WO | WO 02/46031 | 6/2002 |
| WO | WO 2004/014667 | 2/2004 |

* cited by examiner

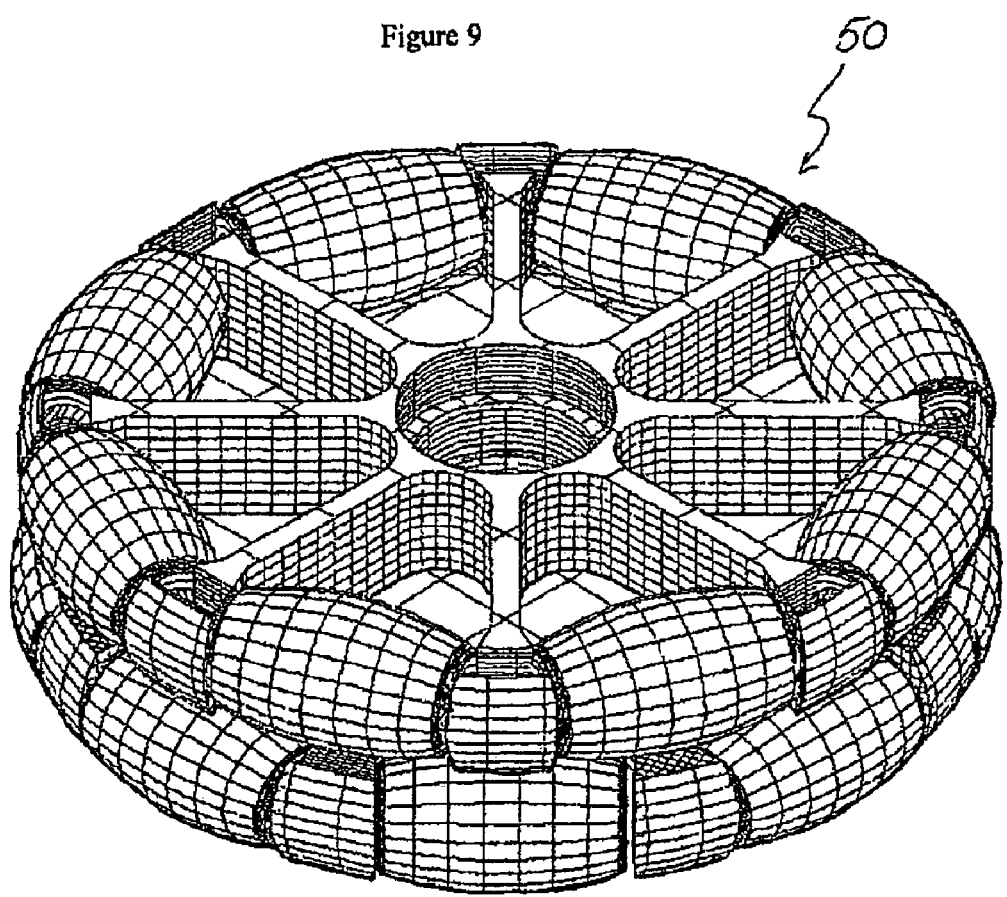
Figure 9
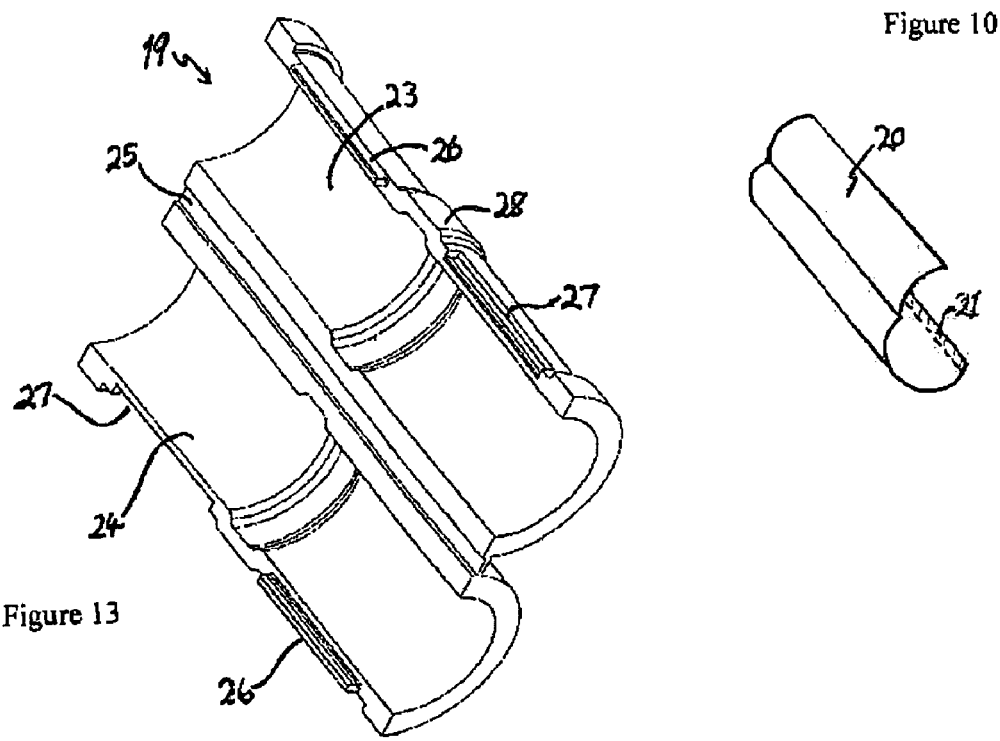
Figure 10
Figure 13

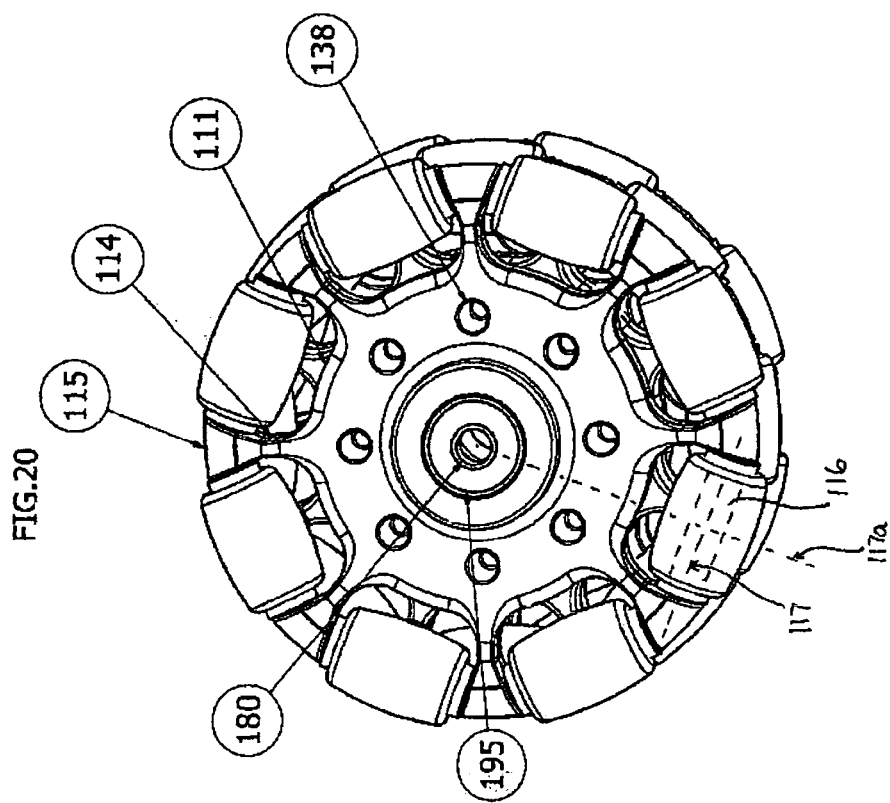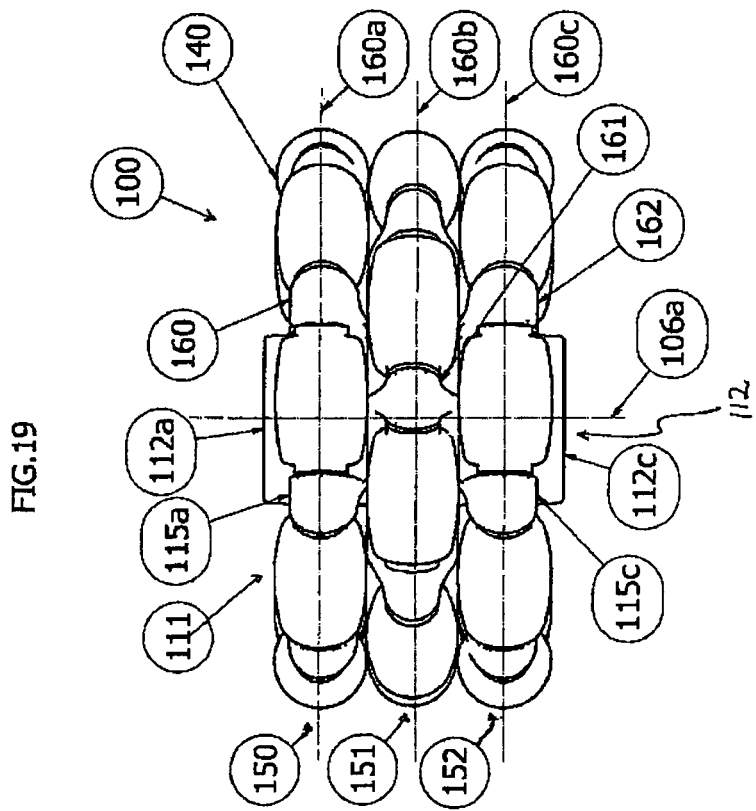

MULTIPLE ROLLER WHEEL

This application is a continuation-in-part, and claims priority, of U.S. patent application Ser. No. 11/050,083, which was filed Feb. 2, 2005, which is a continuation-in-part of PCT/AU2003/001002 (filed Aug. 7, 2003), which claims priority of Australian Patent Application 2002 950635 (filed Aug. 7, 2002), and Ser. No. 11,050,083 also being a continuation-in-part of U.S. patent application Ser. No. 10/275,530, which was filed Mar. 20, 2003 as a 371 National Entry of PCT Application PCT/AU01/01175 (filed Sep. 20, 2001) and issued as U.S. Pat. No. 6,857,707 on Feb. 22, 2005, which claims priority of Australian Patent Application PR 0296 (filed Sep. 21, 2000).

TECHNICAL FIELD

This invention relates to a wheel adapted to travel in more than one direction. More particularly, this invention relates to a multiple directional wheel with a main axis and comprising three or more rows of peripheral rollers adapted to rotate about axes normal to the main axis and radially spaced therefrom.

BACKGROUND ART

The following references to and descriptions of prior proposals or products are not intended to be, and are not to be construed as, statements or admissions of common general knowledge in the art. In particular, the following prior art discussion does not relate to what is commonly or well known by the person skilled in the art, but assists in the understanding of the inventive step of the present invention of which the identification of pertinent prior art proposals is but one part.

A type of wheel capable of multiple directional travel has been described and includes a central hub rotatable about a main axis and a plurality of independently mounted rotatable rollers located about the rim of the hub. The rollers are each capable of rotation about an axis normal to and radially spaced from the main axis whereby the wheel is capable of moving in a first direction in which the wheel rotates about the main axis or in a transverse direction in which one or more rollers contacting the ground rotate about their corresponding axes.

One such wheel has been described in International Patent Application No. PCT/AU01/01175 (publication No. WO02/24471), the entire contents of which is herein incorporated by reference. The multiple directional wheel described therein comprised a circular wheel frame having a plurality of circumferentially spaced peripheral axles on which were mounted a pair of parallel rings of rollers offset relative to one another. The rollers rotated about multiple axes normal to a main axis of the wheel. The roller axes were each aligned substantially normal to lines extending radially from the main axis through the midpoint of each roller axis. The rollers were positioned to provide a large overlap (20%-35% in side view) of effective ground contacting surface between diagonally adjacent rollers.

Further improvement to such types of wheels has been described in International Patent Application No. PCT/AU2003/001002 (publication No. WO2004/014667), the entire contents of which is herein incorporated by reference. That disclosure described a method of construction of a frame on which was mounted a single row of rollers. The single row frames were able to be joined to like frames, in offset orientation, to form multiple rowed wheels having good ground contacting overlap between diagonally adjacent rollers. The method of forming the wheel involved each roller being mounted to a wrap-around bush which, in turn, was mounted to one of the multiple axles.

It is proposed to provide a multiple directional wheel that is a useful alternative to prior art multiple directional wheels, an improvement or modification to the invention described in U.S. application Ser. No. 11/050083 filed 2 Feb. 2005 or U.S. Pat. No. 6,857,707 and/or wholly or partially described but not claimed therein.

DISCLOSURE OF INVENTION

Accordingly, in one aspect there is provided a wheel rotatable about a main axis, including:
a) a frame including a plurality of supports;
(b) a first series of rollers radially spaced from the main axis and aligned with a first plane normal to the main axis, the first series of rollers spaced to form a first discontinuous rim; and
(c) a second series of rollers radially spaced from the main axis and aligned with a second plane normal to the main axis, the second series of rollers spaced to form a second discontinuous rim, the first and second planes aligned parallel to and spaced from one another,
each said roller:
(i) rotatable about an axis normal to the main axis;
(ii) mounted between a pair of the supports; and
(iii) having a lateral central cross-sectional diameter greater than the diameter of its end portions,
whereby, when viewed in side elevation, the effective ground contacting surface of said roller of the first series of rollers overlaps with the effective ground contacting surface of at least one diagonally adjacent roller of the second series of rollers so that the wheel is adapted to make effective ground contact through at least two of the rollers at any one time for effective travel in directions having a component parallel to the main axis,
wherein the frame is incapable of flexing sufficiently to permit the rollers from being removed or dislodged from the frame.

Preferably, the frame is capable of very minimal flexing. However, the frame may flex at high loads but will not flex sufficiently to permit the rollers from being removed or dislodged from the frame at loads under a critical failure load. For example, if the critical load threshold (the load at which the frame will tend to irretrievably deform) is 500 kg/cm$^2$ then the rollers will remain intact on the frame at loads under this amount. At very high loads under the critical load threshold, the frame may marginally flex and this can be advantageous to more evenly distribute the load across the structure, but not sufficiently to permit the rollers from being removed or dislodged from the frame.

In another aspect of the invention there may be provided a wheel rotatable about a main axis, including:
(a) a first series of rollers radially spaced from the main axis and aligned with a first plane normal to the main axis, the first series of rollers spaced to form a first discontinuous rim; and
(b) a second series of rollers radially spaced from the main axis and aligned with a second plane normal to the main axis, the second series of rollers spaced to form a second discontinuous rim, the first and second planes aligned parallel to and spaced from one another,
wherein
(i) said roller is rotatable about an axis normal to the main axis;
(ii) each said roller has a bi-truncated fusiform shape; and (iii) when viewed in side elevation, the effective ground contacting surface of said roller of the first series of rollers overlaps with the effective ground contacting surface of the diagonally adjacent rollers of the second series of rollers to the extent of between 20% and 35% of the length of said roller, so that the wheel is adapted to make effective ground contact through at least one of the rollers at any one time for effective travel in directions having a component parallel to the main axis.

As described in WO2004/014667, a pair of wheel components 11,50 (see FIGS. 1 and 2 corresponding to FIGS. 11 and 12 of herein) include complementary facing surfaces comprising engageable studs 29 and recesses 30. These engagement means are mounted to a disc structure extending radially to an intermediate rim co-axial to the main axis. Extending radially from the central hub through the intermediate rim to the discontinuous rim are a plurality of radial arms 14 adapted to support the rollers 41. As shown, the radial arms 14 extend in a plane that is substantially coplanar with the plane normal to the main axis that the subframe supporting the radial arms 14 of each wheel component 11,50 lies in.

In a particularly preferred aspect of the improvement now proposed, there is provided a wheel with at least three rows of rollers, including at least one inner series of rollers and a pair of outer series of rollers.

Accordingly, in another aspect of the invention, there may be provided a wheel rotatable about a main axis, the wheel including:

(a) one or more inner series of rollers radially spaced from the main axis and aligned with an inner roller series plane normal to the main axis, each roller of the inner series of rollers circumferentially spaced to form an inner discontinuous rim;

(b) a first outer series of rollers on a first side of the inner series of rollers, the first outer series of rollers radially spaced from the main axis and aligned with a first outer roller series plane, the first outer roller series plane aligned substantially normal to the main axis and the first outer series of rollers circumferentially spaced to form a first outer discontinuous rim; and (c) a second outer series of rollers on the other side to the first side of the inner series of rollers, the second outer series of rollers radially spaced from the main axis and aligned with a second outer roller series plane, the second outer roller series plane aligned substantially normal to the main axis, the second outer series of rollers circumferentially spaced to form a second outer discontinuous rim, and the second outer roller series plane substantially parallel to the inner roller series plane and the first outer roller series plane; and wherein (i) said roller is rotatable about a roller axis:
  (x) lying in the plane, in which the series of rollers to which the roller belongs, lies;
  (y) normal to a theoretical line extending radially from the main axis through the plane in (x);
(ii) said roller has a central diameter wider than the diameter of its end portions; and
(iii) when viewed in side elevation, the effective ground contacting surface of each roller of the inner series of rollers overlaps with the effective ground contacting surface of the diagonally adjacent rollers of the outer series of rollers so that the wheel is adapted to make effective ground contact through at least two of the rollers at any one time for effective travel in directions having a vector component parallel to the main axis.

The effective ground contacting surface of each roller of the inner series of rollers may overlap with the effective ground contacting surface of diagonally adjacent rollers of the outer series of rollers to the extent of between 20% and 35% of the length of said roller. This is particularly the case where the rollers of adjacent series of rollers are symmetrically offset relative to one another when viewed in side elevation so that each roller overlaps equally with each of rollers diagonally adjacent to it.

Where the rollers are offset incrementally from one row to the next, the rollers may overlap on one end by at least 10% and at the other end by at most 90% of the length of the subject roller. Such an arrangement is suitable where a wheel according to the invention has three or series of rollers.

The wheel may include a frame including the supports. The frame may include a central hub as well as the plurality of supports. The frame may be integrally formed, such as by a molding or casting process. Each series of rollers may be mounted on the unitary, integrally formed frame as described in WO02/24471 at page 9, lines 7-16.

Alternatively, the frame may be made from separately formed components. Each series of rollers may be mounted on a separately formed frame. The separately formed frames may be modular units that may be joined together.

Preferably, the frame comprises two or more separately formed subframes joinable together to form a single composite wheel frame. An example of this is described in WO02/24471 at page 10, lines 9-15 with reference to FIG. 8 of that disclosure.

The frame may include radial arms extending from a central hub or inner rim to the discontinuous rim of the wheel. The radial arms of one frame may be interleaved with those of another frame so that the radial arms extend into or cross over the plane of alignment of an adjacent frame. The interleaving of radial arms may comprise the engagement means by which adjacent frames are joined.

All or some of the supports of one subframe may support all or some rollers of a series or row aligned in a parallel plane spaced from the plane of that subframe. Preferably, however, where the frame is made up of component parts such as subframes, each series of supports lies substantially in the plane of the corresponding subframe.

Preferably, the frame comprises two or more modular or component subframe parts. A first of the subframes may support the first series of rollers and a second of the subframes supports the second series of rollers. Preferably, the subframes are joined by engagement means comprising complementary parts on the first and the second subframes. The subframes may be formed in a first process and then subsequently joined by any of a variety of means, including sonic welding or cold or hot pressing. The complementary parts may be press-fitted. The complementary parts may include male/female engagement means. An example of the means of engagement of adjacent subframes is shown in the form of studs 29 and corresponding recesses 30 in FIGS. 1 and 2 of WO2004/014667. Preferably, each subframe supports a series of rollers, although a subframe may support more than one series of rollers, each series is a corresponding separate plane.

The complementary parts may include positive engagements. The engagement of the complementary parts may be non-reversible. In one preferred form, the engagement means is reversible so that the subframes may be used as modular recombinable parts of the wheel.

Preferably, the frame includes at least one inner subframe supporting a corresponding at least one inner series of rollers radially spaced from the main axis and aligned with an corresponding inner plane normal to the main axis. The inner series of rollers may form an inner (relative to the outer series of rollers) discontinuous rim. When viewed in side elevation, the effective ground contacting surface of each roller of at least one of the outer series of rollers may overlap sufficiently with the effective ground contacting surface of the diagonally adjacent rollers of the inner series of rollers either side the subject outer roller to ensure good ground contact of at least an inner and an outer roller.

Preferably, the one or more inner subframes comprise an inner rim. Preferably, the inner rim is concentric relative to the main axis. Preferably, at least one of the subframes includes a hub about the main axis for mounting to an axle or spindle. Preferably, the inner rim has a central aperture with a diameter greater than the diameter of the bore defined by the hub and adapted to be spaced from the axle or spindle so that there is a clear concentric space between the axle or spindle.

Each subframe may include an inner rim defining a central cavity or aperture to receive a shaft, etc. The aperture of at least one of the subframes may be defined by a hub adapted to abut a main axle. The main axle is preferably coaxial with the main axis. The main axle assembly may be in the form of a shaft or spindle, and may include bearing means, etc. The subframe may be mounted on the main axle assembly and secured thereto by a press fit, adhesive, welding, positive engagement means or by any other suitable fixing means. The main axle may be journalled for mounting the hub. Preferably, the main axle assembly is press fitted to the hub whereby the hub and axle are engaged against axial displacement. The main axle may rotate with the wheel and be journaled for rotatable support on suitable mountings. Where the main axle mounting includes bearing means, such as a ball bearing arrangement, the outer casing of the bearing may rotate with the central hub and the inner casing may be fixed non-rotatably relative the wheel.

Where three or more subframes are joined to form a wheel frame, one or more of the outer subframes may be press-fitted via their central hubs to the main axle assembly. The outer surface of the main axle assembly may therefore be non-rotatable (i.e. fixed) relative to the outer subframe by fixedly mounting the hub thereof on the outer surface of the main axle. As a consequence of the subframes being rigidly joined to one another to form the complete wheel frame, the outer surface of the main axle assembly may be non-rotatable (fixed) relative to the entire wheel frame. The outer surface of the main axle may have physical features, such as protrusions, ridges, slots, grooves or the like adapted to cooperate with complementary physical features on the inner surface of the central hub. Such physical features assist to fix the central hub non-rotatably relative to the main axle outer surface.

The central aperture of the one or more inner subframes or one or more outer subframes may have a diameter or clearance larger than the external diameter or width of the main axle assembly. This is irrespective of the shape of the central cavity or aperture the cross section of which may be other than circular, such as square, triangular or otherwise polygonal, or may be irregular. Preferably, the aperture is circular to provide good rotational dynamic balance. Preferably, the inner rim of at least one of the one or more inner subframes defines a wide circular aperture, well clear of the external surface of the main axle or shaft etc. assembly, to minimise the material mass and costs of the inner subframe. The inner subframe may also thereby be capable of minimal flexing as described below in more detail. Preferably, the subframe including the inner rim may be formed from substantially less material than the subframe with the hub. Preferably, the inner rim is in the shape of a ring from which the radial arms extend outwards to the supports.

In accordance with another aspect of the invention, there is provided a wheel rotatable about a main axis, the wheel including:
(a) one or more inner series of rollers radially spaced from the main axis and aligned with a inner plane normal to the main axis, each roller of the inner series of rollers spaced to form an inner discontinuous rim;
(b) two outer series of rollers, a first the outer series of rollers positioned on one side of the inner series of rollers and a second the outer series of rollers positioned on the other side of the inner series of rollers, the pair of outer series of rollers radially spaced from the main axis and aligned with a corresponding pair of outer first and second planes normal to the the main axis, the pair of outer series of rollers spaced to form first and second outer discontinuous rims, the first and second outer planes aligned parallel to and spaced either side of the inner plane,
wherein
(i) said roller is rotatable about an axis normal to the main axis;
(ii) said roller has a central diameter wider than the diameter of its end portions; and
(iii) when viewed in side elevation, the effective ground contacting surface of said roller of each of the outer series of rollers overlaps with the effective ground contacting surface of at least one diagonally adjacent roller of the inner series of rollers to the extent of between 10% and 90% of the length of said roller, so that the wheel is adapted to make effective ground contact through at least one of the rollers at any one time for effective travel in directions having a component parallel to the main axis,
wherein the rollers are mounted on a frame that is incapable of flexing sufficiently to permit the rollers from being removed from the frame.

In particularly preferred form of the invention, there is provided a wheel with a central or inner subframe and a pair of outer subframes. One or both of the outer subframes may be mounted on the shaft, etc., whereas the central subframe may have an inner rim that defines a cavity about the shaft, etc. that is concentrically spaced therefrom. The large inner cavity defined by the inner rim provides a number of functional differences relative to the arrangement where the inner rim abuts the shaft, etc. Less material is required for the inner subframe with consequent savings in production costs. The inner subframe may be a rigid structure by means of its regard engagement to subframes adjacent to it and by reinforcement structures such as tangential, radial and/or concentric ribs.

Alternatively, the inner subframe may be marginally flexible. The inner subframe may be capable of sufficient flexion to permit redistribution of load from the ground contact roller of the inner subframe to at least one roller of one of the outer subframes. Preferably, the wheel is mounted on a main axle or shaft etc. extending through the inner rim and the hub and the main axle is not in physical contact with the inner rim. On the application of a load on the central row of rollers, the ground contacting central rollers may be marginally displaced due to the flexion of the central subframe permitted by the hollow centre thereof and the structural configuration of the central subframe. The slight flexion on the central row of rollers may thereby allow a redistribution of the load so that a greater load is placed on the pair of the outer series of rollers.

The outer series of rollers may be more rigidly supported by their direct mounting on the shaft, etc. Furthermore, they may be spaced and may combine to have double the ground contacting surface area of the central row of rollers. The load may therefore be advantageously more evenly distributed across the three rows of rollers. The surprising result is an improved rolling performance in directions having a component parallel to the main axis as the load on the single inner row is slightly reduced in favour of the pair of outer rows of rollers.

In another preferred form, the wheel includes one or more central rows of rollers flanked by a pair of outer rows of rollers. The outer rows of rollers may be mounted on supports forming the terminating end of radial arms extending from the central hub or respective central hubs.

Preferably, the roller axle plane in which the roller axes of one of the outer series of rollers lies is not coplanar with the corresponding plane in which the outer subframe supporting the outer series of rollers predominantly lies, whereby the rollers of the outer series of rollers are mounted on supports extending outwardly from the outer subframe plane to the outer roller axle plane. The radial arms supporting the outer rollers may be excluded outwardly away from the central row of rollers. The consequence is that the outer radial arms are capable of slight flexion under load. Preferably, the outer supports are capable of sufficient flexion to permit redistribution of load from the ground contact roller of the outer subframe to at least one roller of the inner subframe.

In combination with a central subframe cavity permitting slight flexion with load of the central subframe and displacement of the central rollers, the sum load on the wheel may be more evenly distributed to provide improved rolling performance in lateral directions transverse to the main axis. Moveover, the hollow central cavity may provide improved dissipation of heat from the core of the wheel to reduce overheating and minimise degradation of the materials of the inner portions of the wheel.

The skilled person will appreciate that, because the subframes are fixedly secured to each other to form the wheel frame, only one of the subframes need be directly mounted to the main axle assembly. For the purposes of balance, preferably the wheel is axially symmetrical whereby the wheel is symmetrical about a central plane normal to the main axis. However, this is not essential and there will be applications where the outer subframes are not mirror images of each other, the inner subframes (where there is more than one) are not mirror images of each other, or the wheel is otherwise not bisymmetrical about a central plane normal to the main axis. For example, in applications where a wheel is mounted to a spigot that extends from only on side of the wheel, the respective outer subframes or rims may be considerably different.

The central hub or rim of at least the outer subframes is preferably co-axial with the main axis and mountable to the main axle.

Where the bore is generally cylindrical, the internal surface of the central hub bore may be augmented by one or more physical features. The physical feature may include studs, protrusions, dimples, recesses, slots or circumferential, spiral or axial grooves or ridges. The physical feature may be adapted to resist axial play of the shaft, etc. within the central hub bore. It may comprise protrusions or depressions able to cooperate with corresponding features on the shaft, etc. to axially secure the shaft, etc. within the bore.

Preferably, the central hub bore is keyed along axial lines whereby the shaft, etc. has at least one complementary axially aligned feature adapted to resist rotation about the main axis within the central hub bore. The axially aligned feature may include one or more ridges, one or more grooves or a combination of ridges and grooves. Preferably, the central hub bore includes one or more axially aligned channels adapted to receive a correspondingly keyed generally cylindrically shaped object, such as a bearing having one or more axially aligned ridges receivable in the grooves. The axial alignment of the physical features advantageously permits the cylindrical object to be inserted in the central hub bore to be slid in axially and secured against axial play by a laterally aligned physical feature or a strong adhesive such as an epoxy resin.

The radial structures supporting the rollers are preferably pillars extending radially from the central hub or from the intermediate rim. The radial structures supporting the middle series of rollers may be bi-symmetrical along the middle plain. The outer series of rollers may be supported by radial structures whose centre of mass lies outside the respective outside plain. The outside radial structures may extend away from the rollers of the middle series, the portion of the outer radial structures extending from the intermediate rim to an outer terminating head of the radial structures, extending at an angle away from the middle rollers. This may permit the wheel frame, comprising the central hub, the radial structures and or the intermediate rim, to be more compactly made and to require a lesser volume of material, whilst permitting the middle and outer rollers to be sufficiently spaced relative to one another in directions parallel to the main axis. It may also enable the wheel to present a wider footprint or tread to achieve improved lateral stability of the wheel.

Preferably in use, the wheel is mounted to a main axle extending through a central bore of the central hub whereby the wheel is capable of rotating about the main axis, the main axis of fixed position relative to an article mounted on the main axle whereby the article may be caused to travel in any direction involving:
    (a) rotation of the wheel about the main axis;
    (b) rotation of one or more of the rollers about their respective roller axes; or
    a combination of rotation of the wheel about the main axis and rotation of one or more of the rollers about their respective transverse axes to enable diagonal travel.

The wheel may comprise one or more middle series of rollers as required by the particular application. For example, extremely heavy load applications may warrant the use of two or more series of inner rollers. In each case, each roller is offset relative to its diagonally adjacent neighbours to achieve sufficient overlap when viewed inside elevation to achieve effective travel in directions including a vector component in a direction parallel to the main axis.

BRIEF DESCRIPTION OF DRAWINGS

The invention may be better understood from the following non-limiting description of a preferred form of the invention and the drawings in which:

First Version

FIG. 9 is a perspective view a completed wheel of the third embodiment.

Second Version

Figure 11:
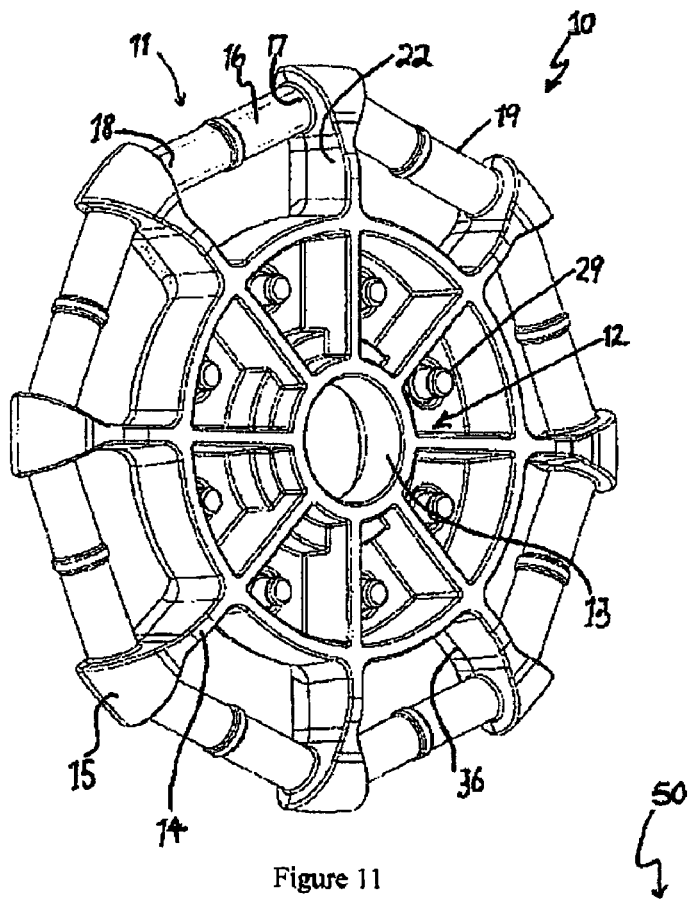
Figure 12:
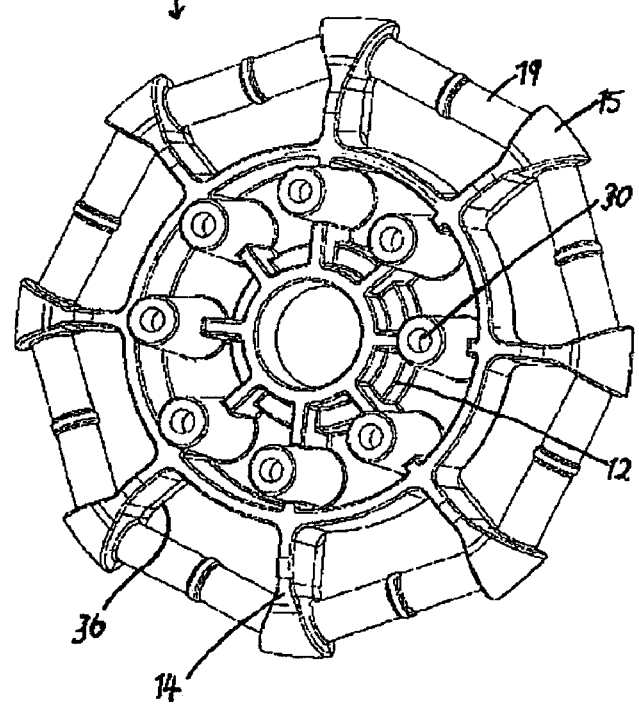
Figure 14:
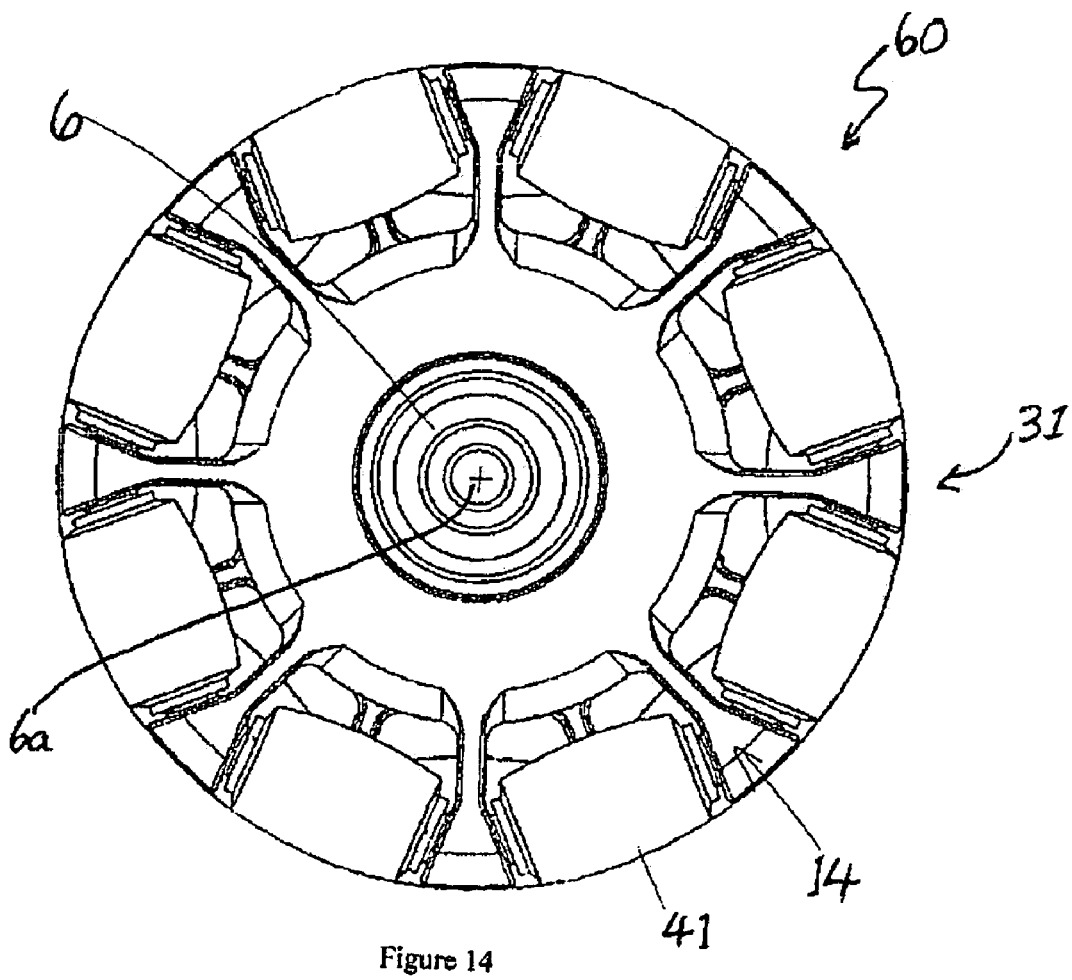
Figure 15:
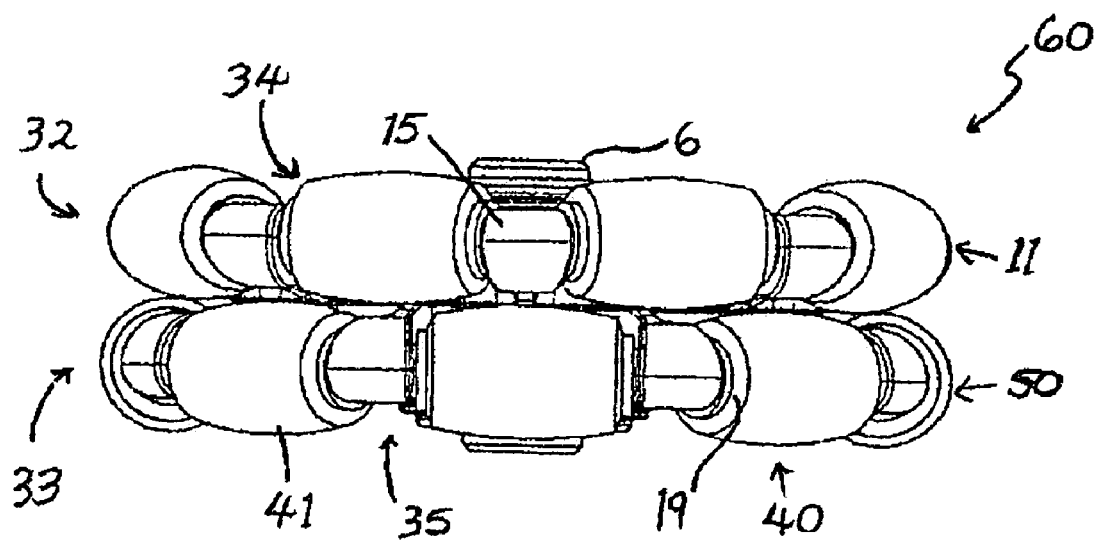
Figure 16:
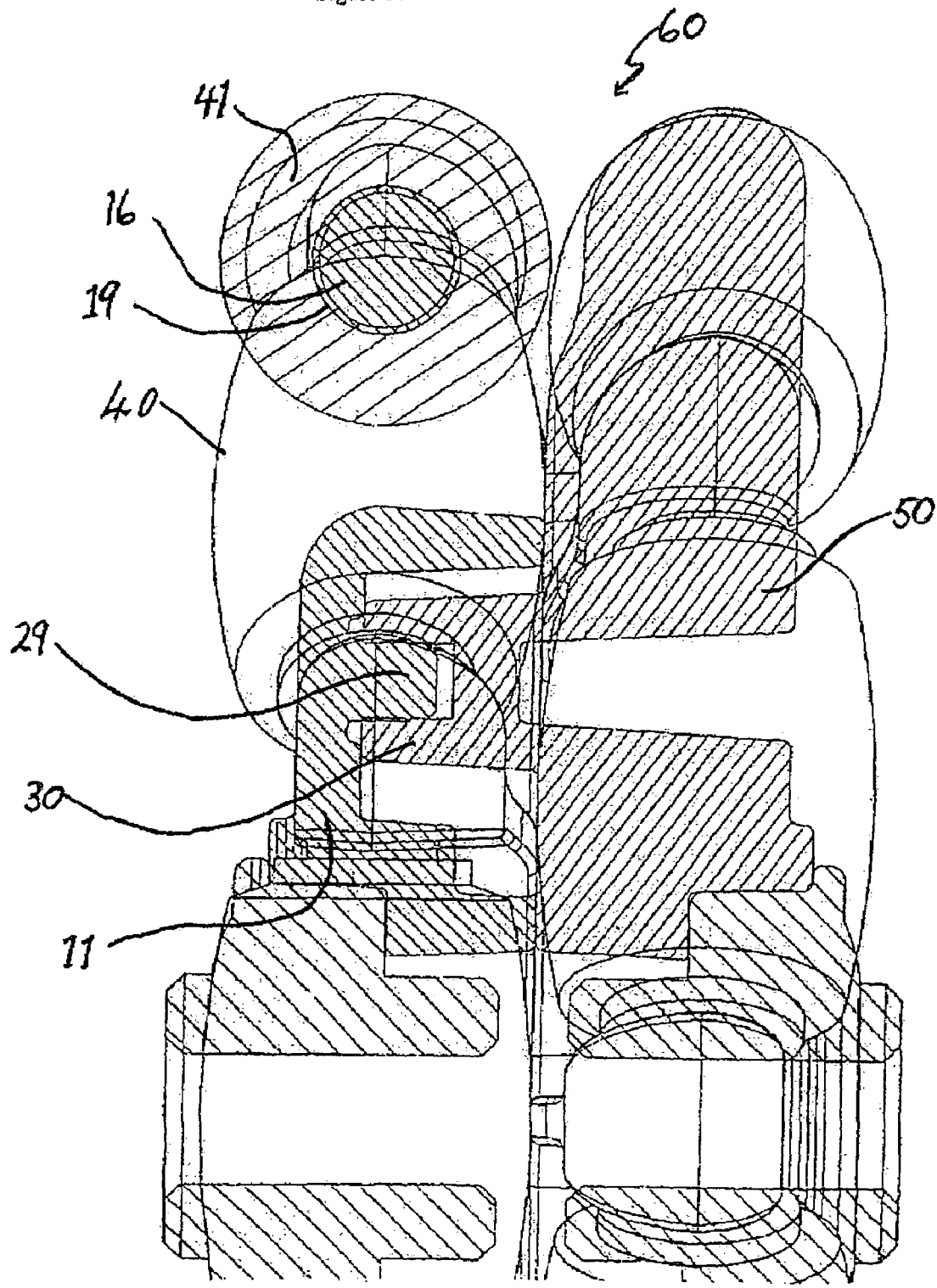
Figures 17, 18:
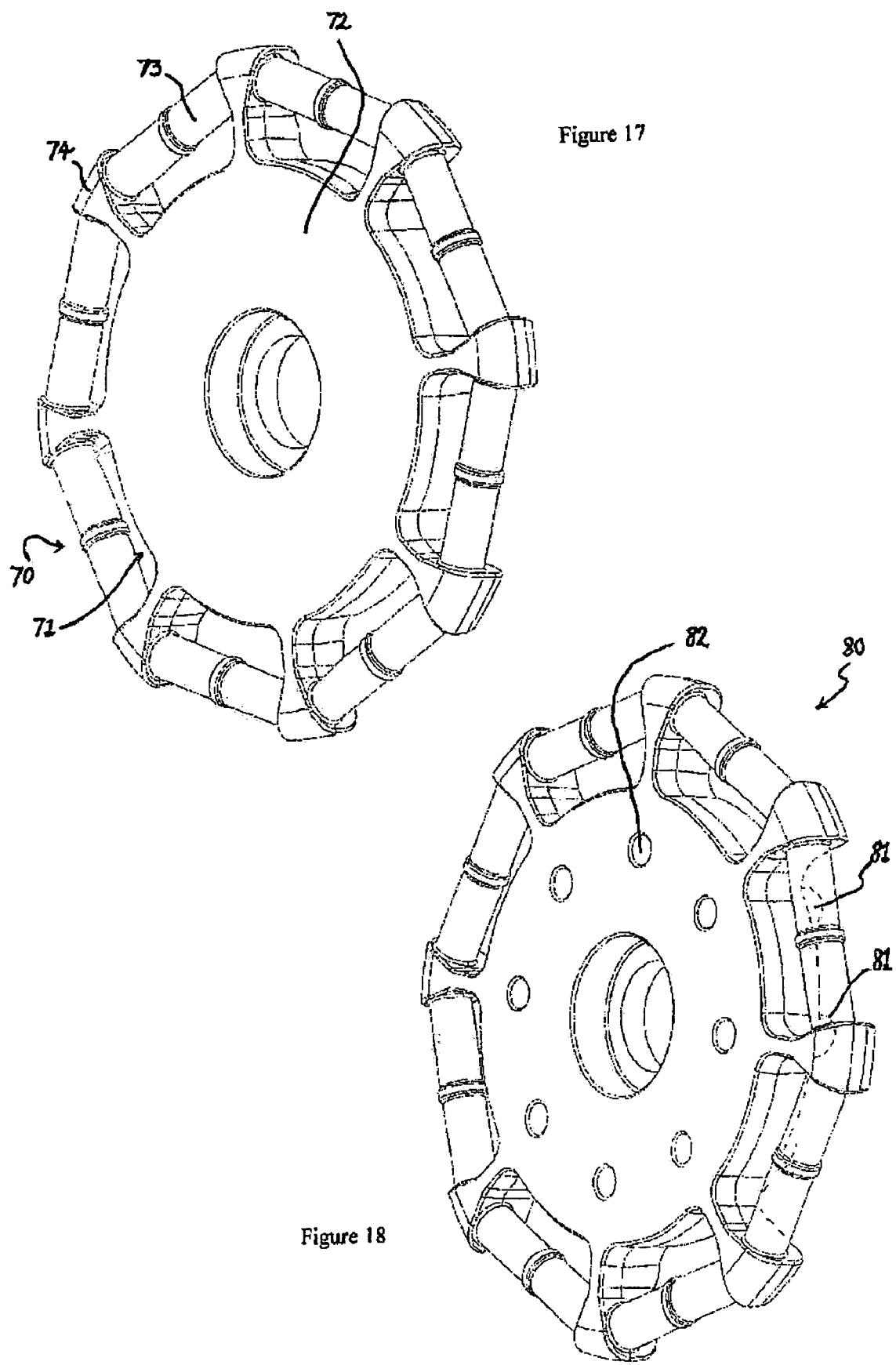

FIG. 10 is a perspective view of a hinged bush used to clip around a roller support of the parts of FIGS. 11 and 12;

FIG. 11 is a perspective view of one part of an integrally formed wheel of the present invention;

FIG. 12 is a perspective view of the other part which is joined together with the part of FIG. 11 to form a wheel according to a fourth embodiment;

FIG. 13 is a perspective view of a temporary sleeve;

FIG. 14 is a side elevational view of a completed wheel according to the fourth embodiment;

FIG. 15 is an end view of the wheel of FIG. 14;

FIG. 16 is a sectional view showing an ultrasonically stud weld joined between the two parts;

FIG. 17 is a perspective view of a fifth embodiment of the wheel; and

FIG. 18 is a perspective view of a sixth embodiment of the wheel.

Third Version

FIG. 19 is a top plan view of a wheel according to a third embodiment.

Figure 22:
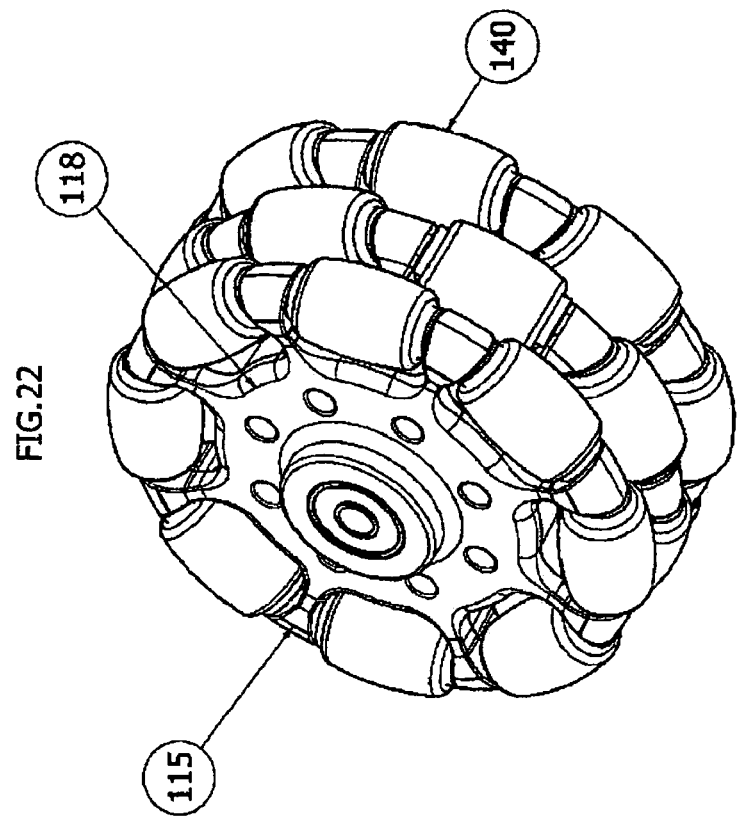
Figure 21:
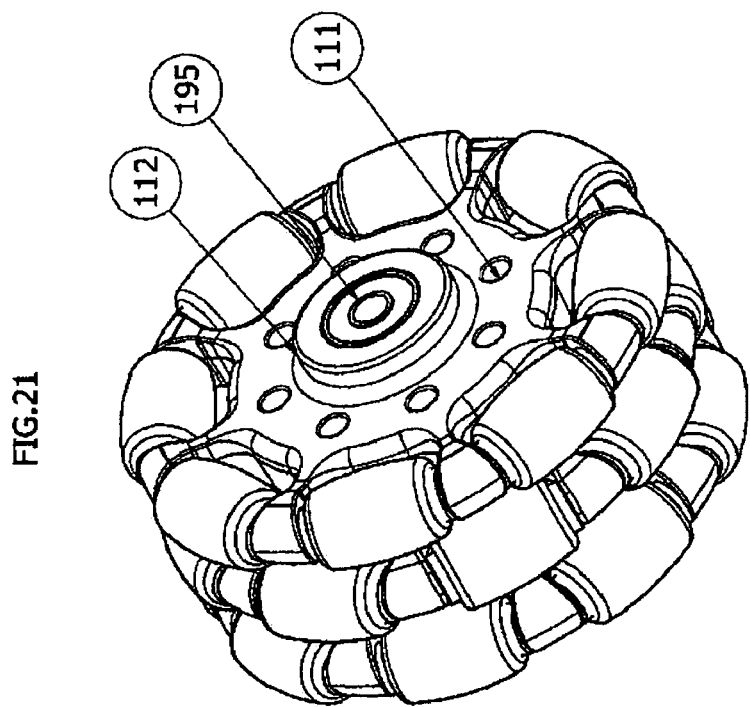
Figure 24:
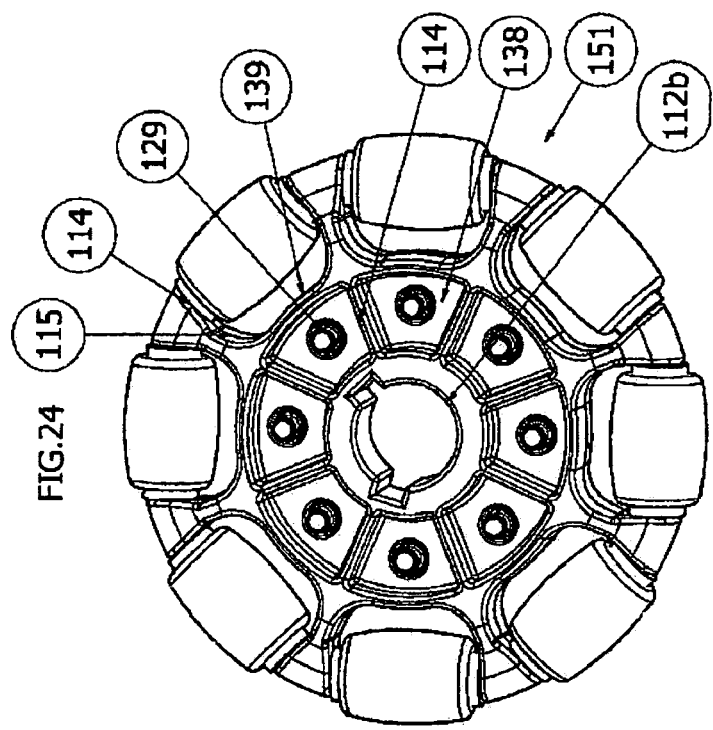
Figure 23:
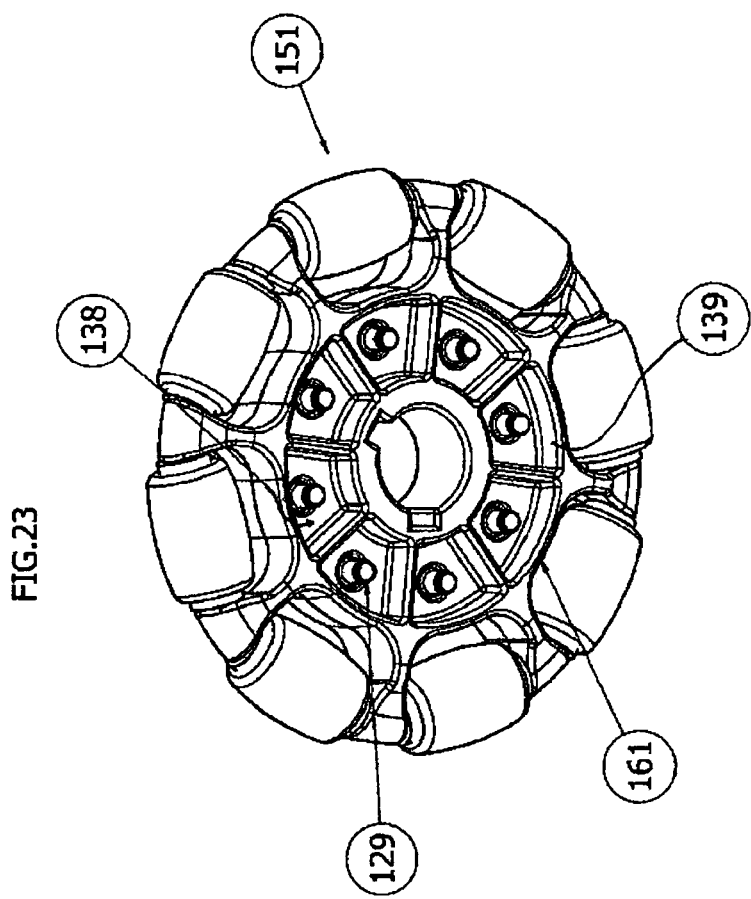
Figure 26:
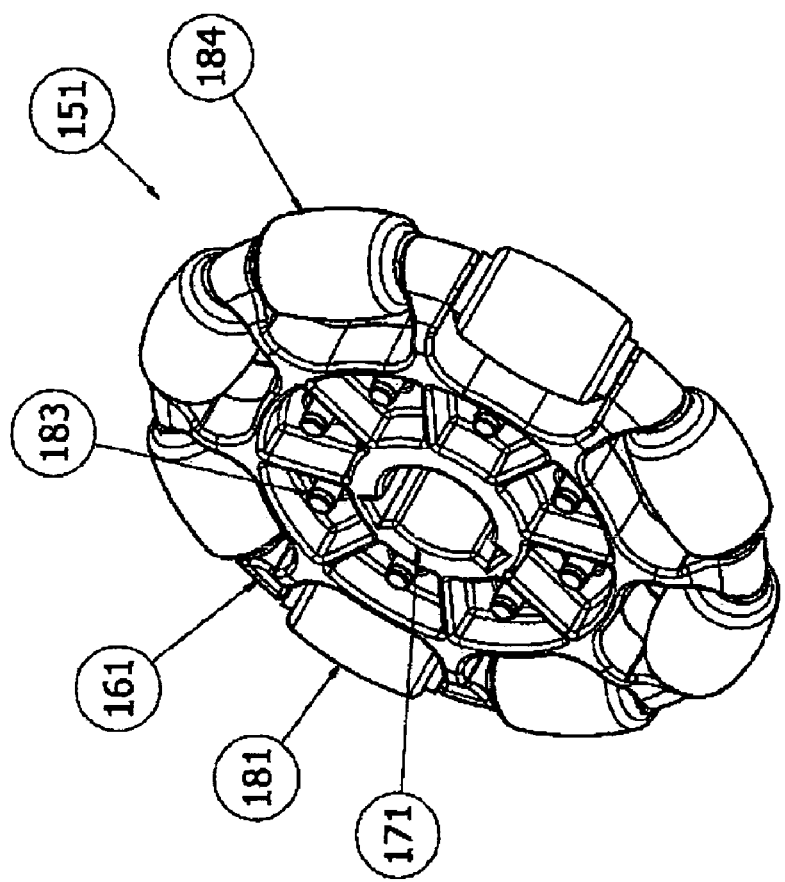
Figure 25:
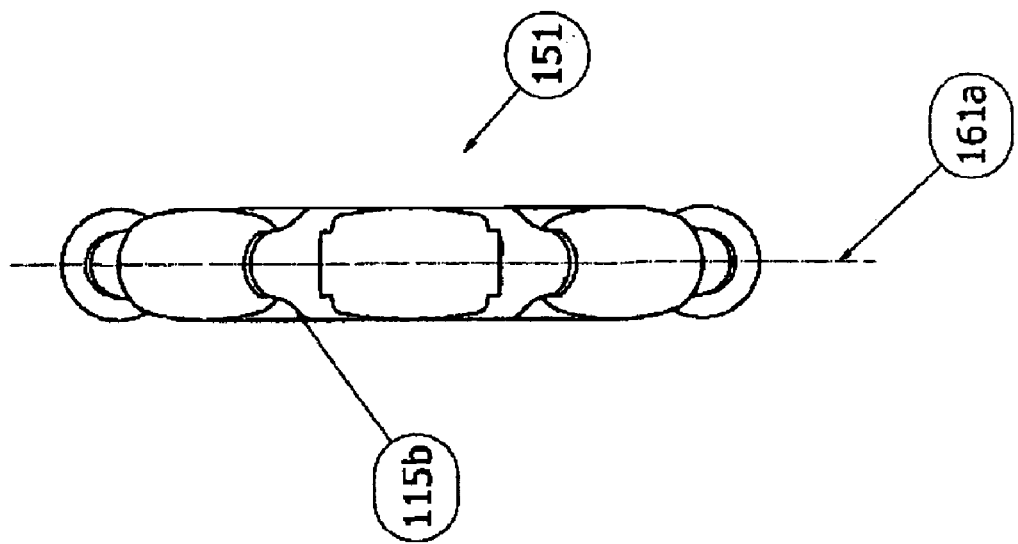
Figure 27A:
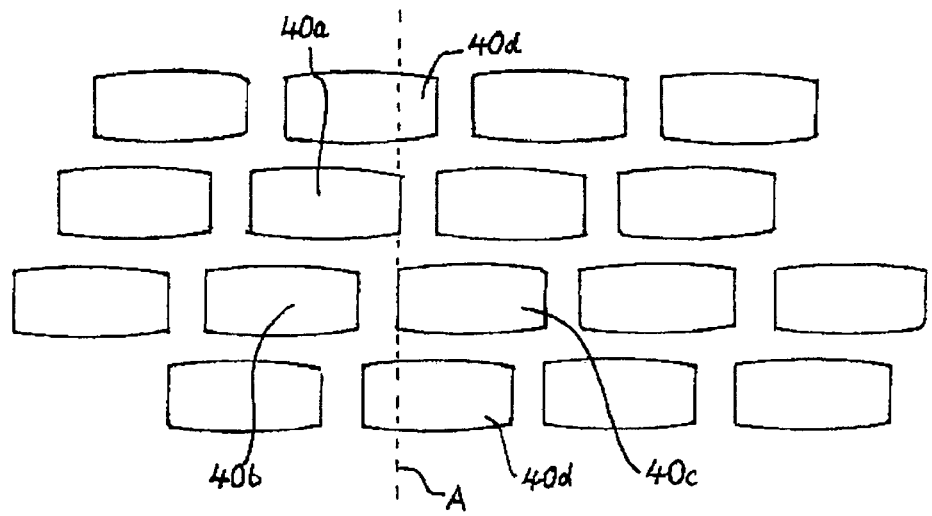
Figure 27B:
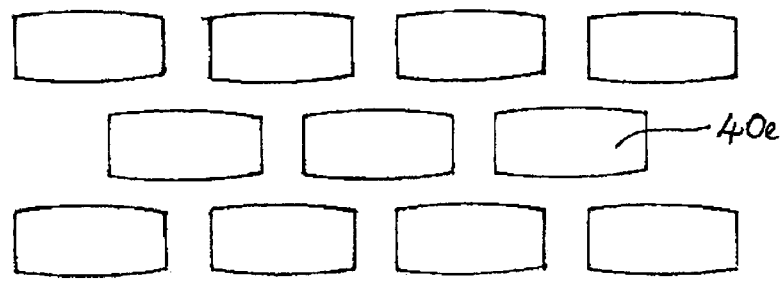
Figure 27C:
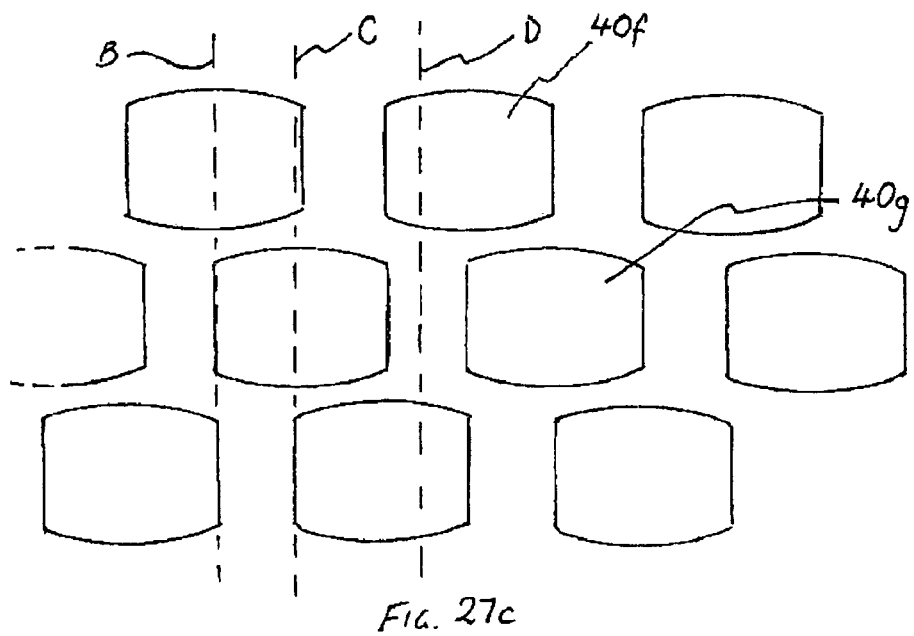
Figure 28:
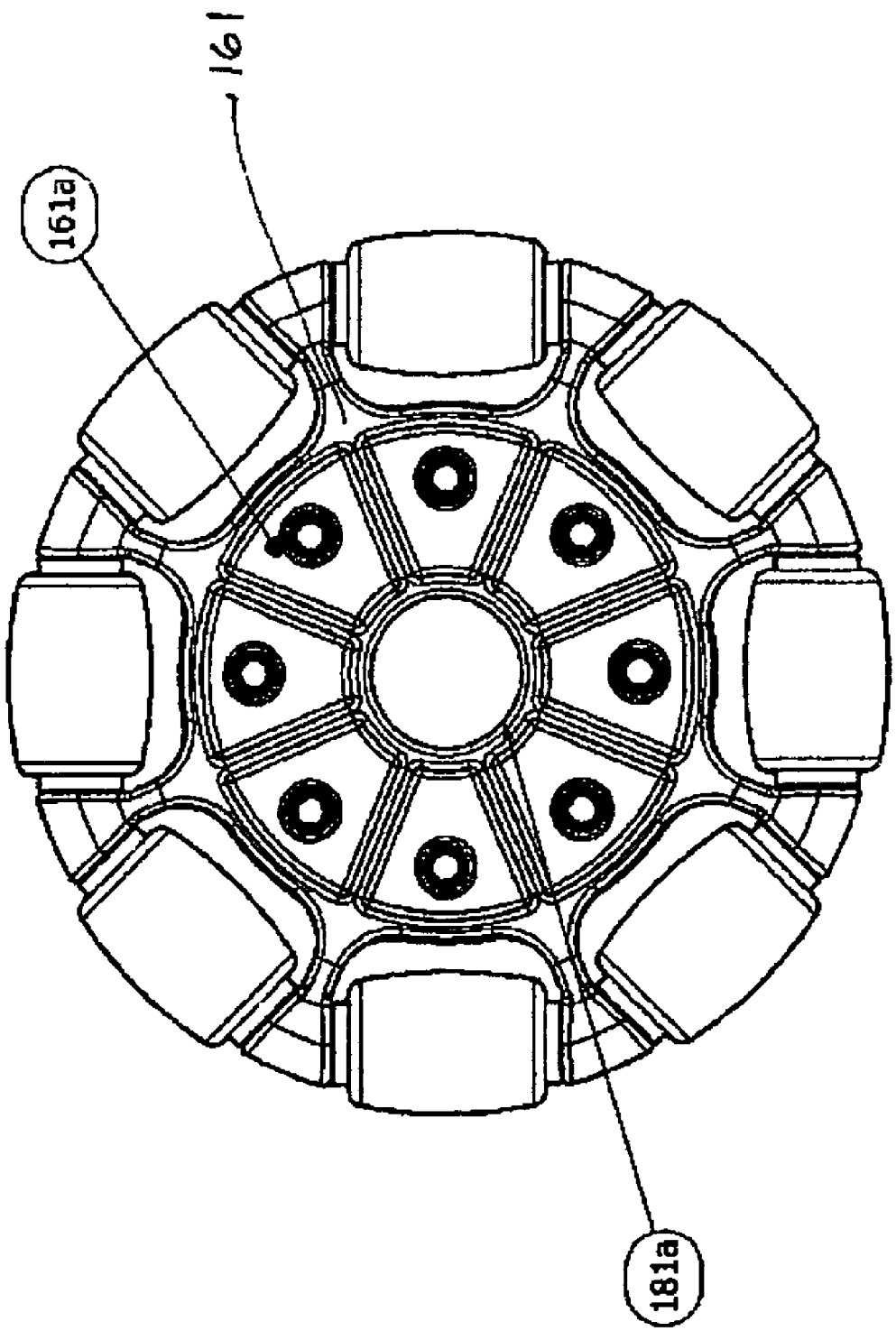

FIG. 20 is a side elevation of the seventh embodiment shown in FIG. 19;

FIG. 21 is a perspective view of the seventh embodiment shown in FIG. 19;

FIG. 22 is another perspective view of the seventh embodiment shown in FIG. 19;

FIG. 23 is a perspective view of an inner single row wheel forming part of the seventh embodiment;

FIG. 24 is a side elevation of the inner single row wheel shown in FIG. 23;

FIG. 25 is a top plan view of the inner single row wheel shown in FIG. 23; and FIG. 26 is another perspective view of inner single row wheel forming part of the seventh embodiment;

FIGS. 27*a* to 27*c* are schematic representations of "footprints" of wheels having alternative roller arrangements; and FIG. 28 is a side elevation view of an inner subwheel having a large central aperture.

FIRST VERSION DESCRIPTION

Figure 1:
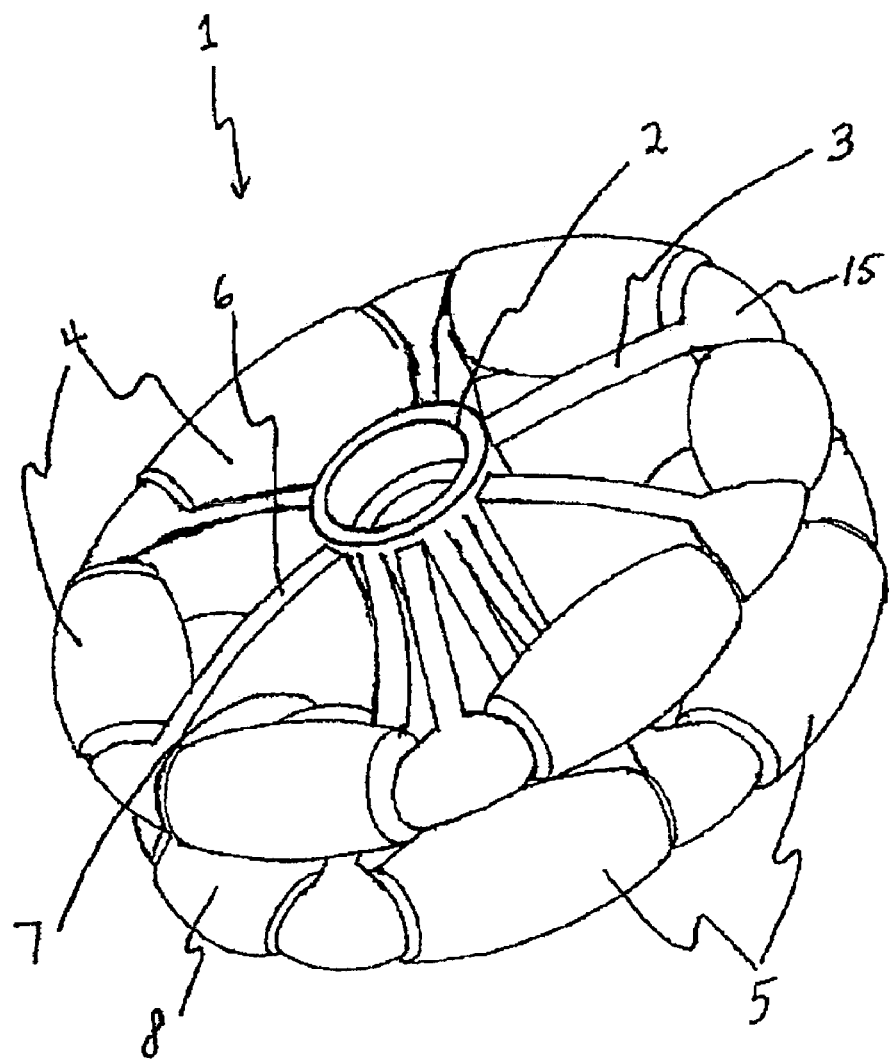
FIG. 1 is a perspective view of the wheel according to a first embodiment.

In FIG. 1 there is shown a wheel 1 comprising a central hub 2 and radially extending ribs 3 depending from the central hub 2 to form a wheel frame, and a first series of rollers 4 and a second series of rollers 5.

The central hub 2 defines a cylindrical core through which a main axle (not shown) may be inserted. The radial ribs 3 include a shallow outwardly curving edge 6 and a deep arched edge 7 adapted to provide clearance for an adjacent roller. Each rib 3 supports either end of a pair of rollers of one of the first or second series of rollers 4,5 and the arched edge 7 provides clearance for a roller 4,5 of the roller series not supported by the rib 3. For example, in FIG. 1 the rib referenced by numerals 6, 7 supports a pair of rollers 4 of the first series of rollers and its arched edge 7 provides clearance for a particular roller 8 belonging to the second series of rollers 5.

Figure 2:
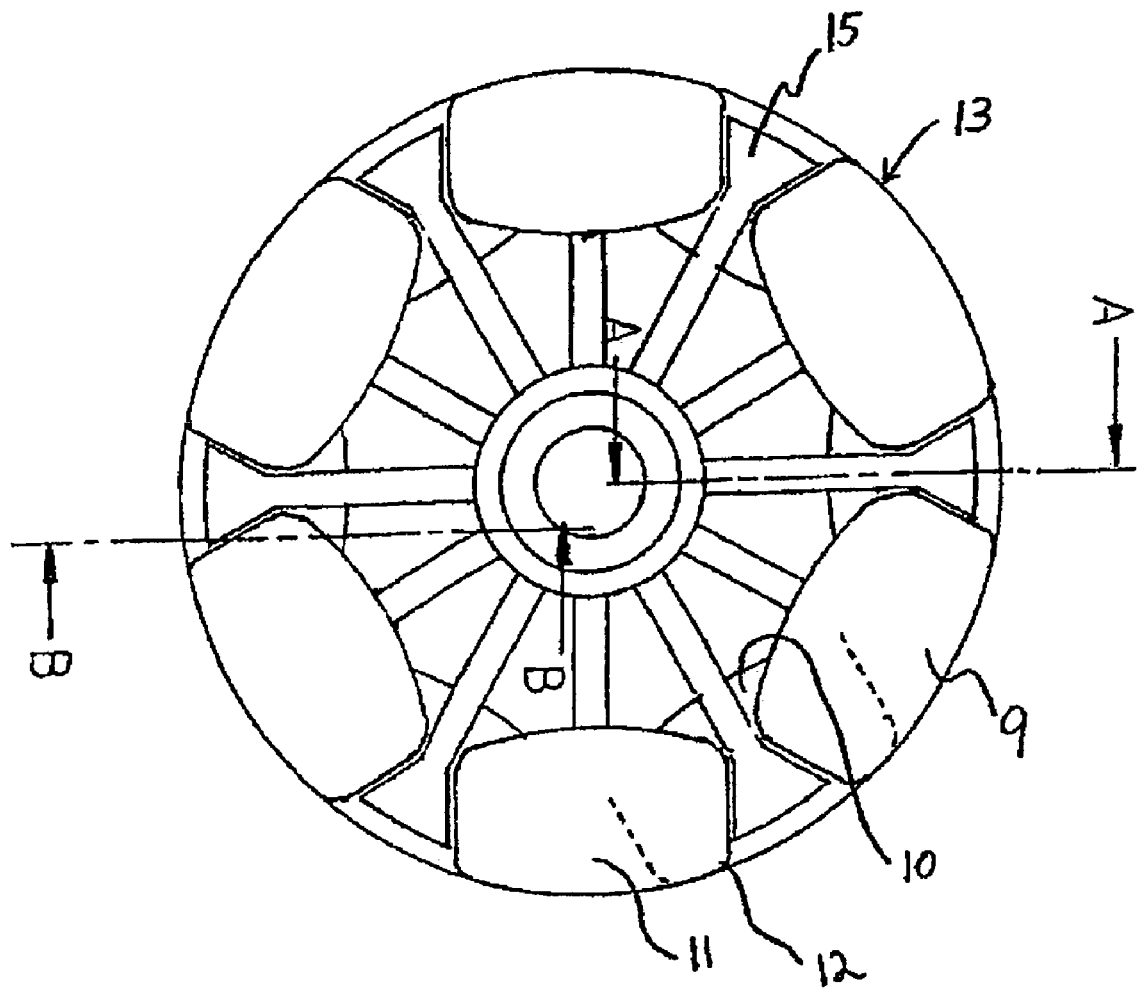
FIG. 2 is a side elevation of the embodiment shown in FIG. 1.

With reference to FIG. 2, each roller 4,5 in side elevation is of a bi-truncated elliptical shape having a main body 11 having a larger diameter than each of the end portions 12. Considerable overlap is provided between diagonally adjacent rollers 9, 10 when viewed from a side elevation. This is particularly important as the utility of the invention depends on good ground contact being made by the main body 11 of at least one roller of the wheel 1 rather than an end portion 12 alone of the roller.

It can be seen that the first and second series of rollers 4,5 in combination present a rim 13 having a substantially continuous circular profile. The circular rim profile 13 enables the wheel 1 to display a smooth rotation over the ground travelling in a direction transverse to the main axis and relatively smooth travel in directions parallel to the main axis. Moreover, the combined effect of the circular rim profile 13 together with the large diameter of the main body 12 and the substantial overlap between diagonally adjacent rollers 9,10 provides the wheel 1 with relatively smooth travel in directions parallel to the main axis.

Figure 3:
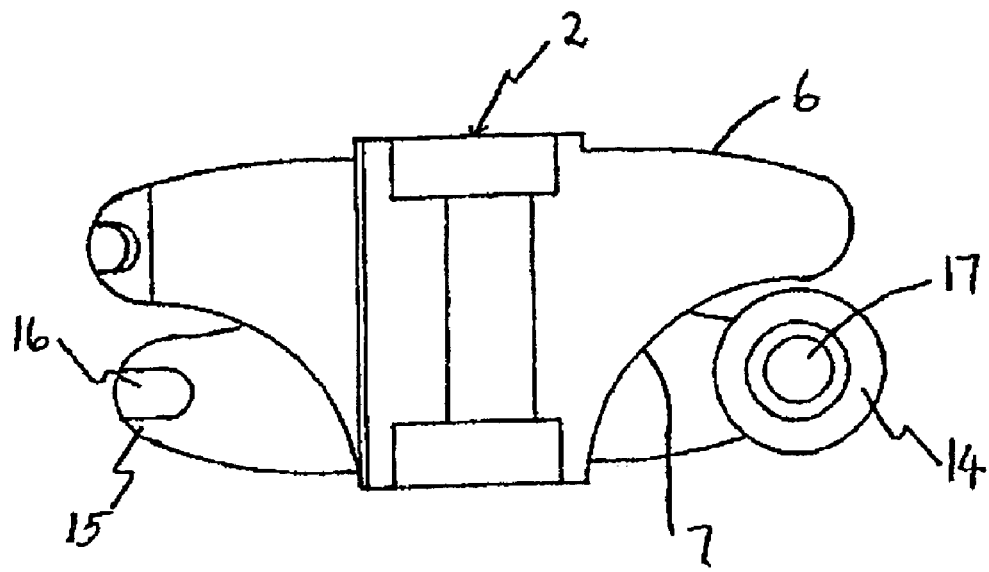
FIG. 3 represents transverse sections A-A and B-B shown in FIG. 2.

With reference to FIG. 3, the wheel is shown in transverse section with only one roller 14 displayed in order to make other features more clear. Each rib 3 terminates at its outer end with a head 15 having a frustoconical shape when viewed from a side elevation (see FIG. 2). Each head includes slots 16 adapted to non-rotatably receive in snug friction-fit a roller axle 17 of circular cross-section. Each head 15 may include a pair of slots or a single slot extending through the head 15.

During manufacture, the frame is formed in one integral piece by injection molding.

Figure 4:
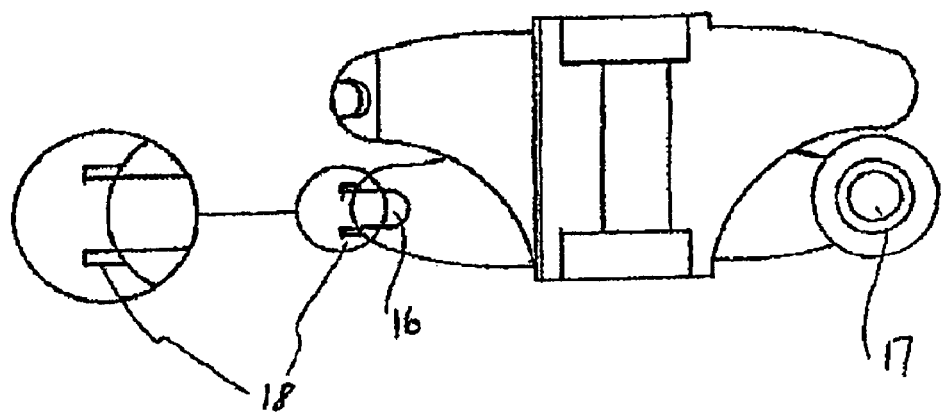
FIG. 4 is a sectional view of a second embodiment.

The roller axles are all formed in a separate process by injection molding. In an automated process, the rollers 4,5 are applied to the wheel 1, six rollers 4,5 at a time in a two stage process whereby to complete the wheel 1. That is, the first series of rollers 4 is applied in a single automated process to the frame in a first stage and the second series of rollers 5 is applied to the frame in a second stage. Each of the roller axles 17 may then be secured within respective slots 16 by the heat fusion of a pair of opposed plastic flaps 18 shown in FIG. 4. The roller axle 17 is not heat fused to the flaps 18. The flaps 18 are heat sealed whereby to prevent the inadvertent dislodgment of the roller axle 17 from the slot 16.

In use, a main axle may simply be mounted to the side of an object to be movably supported, the wheel 1 rotatably mounted on the main axle and secured by a split pin or the like. By mounting three or more such wheels 1, the object may be moved in directions parallel and transverse to the main axle.

Figure 5:
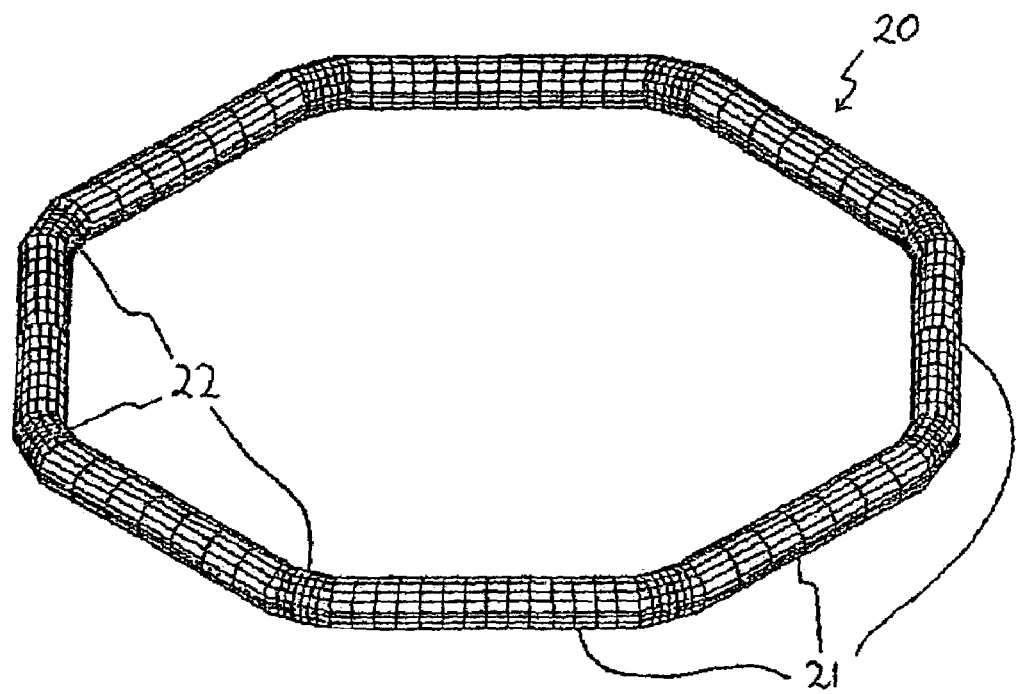
FIG. 5 is a perspective view of a polyaxled ring of a third embodiment.

In FIG. 5, there is shown a polyaxled ring 20 having a predominantly hexagonal shape and comprising 8 linear. sections 21 joined by corner portions 22. The polyaxled ring 20 is solid cylindrical in cross-section. The polyaxled ring 20 is made from acetal for strength and rigidity. The polyaxled ring 20 is integrally formed by injection molding.

Figure 6:
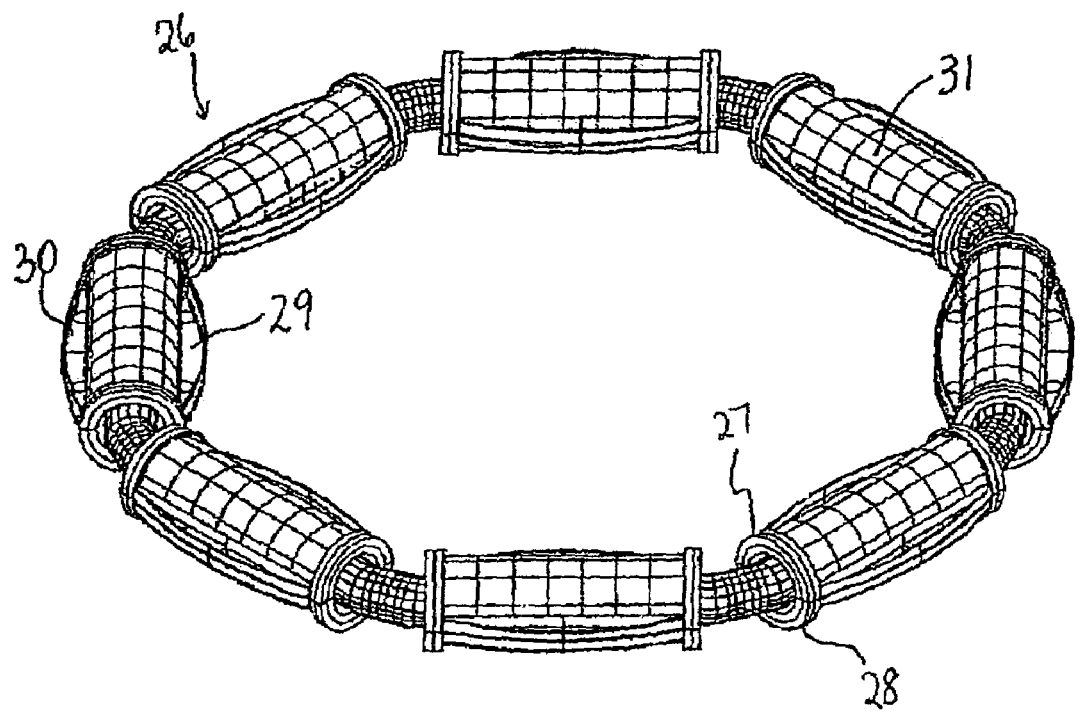
FIG. 6 is a perspective view of a polyaxled ring of the third embodiment bearing roller bushes.
Figure 7:
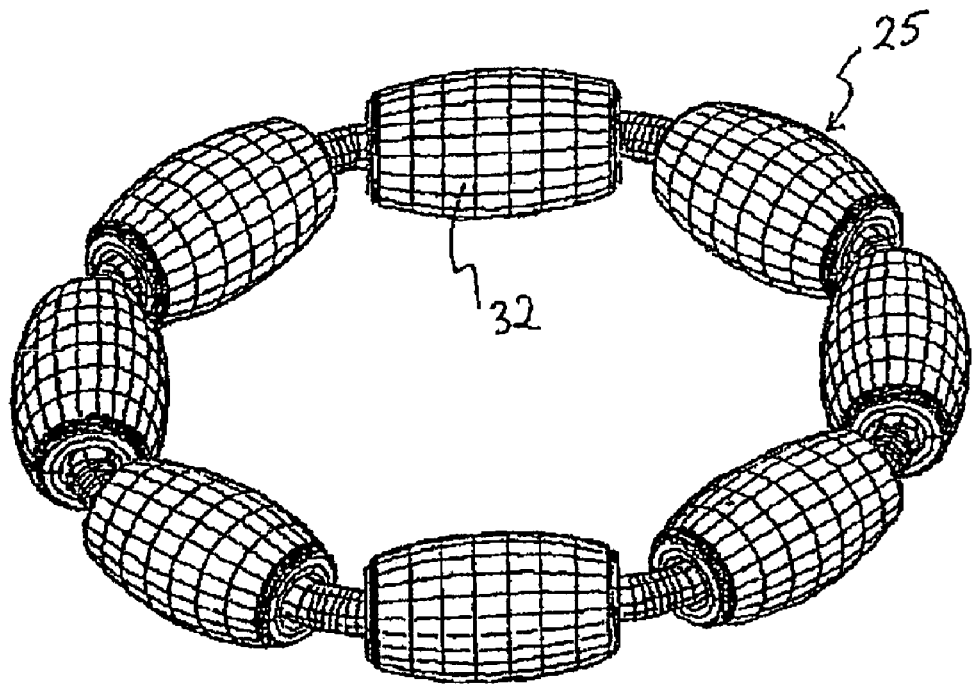
FIG. 7 is a perspective view of a polyaxled ring of the third embodiment bearing finished rollers.

Rollers 25 shown in FIG. 7 are formed in a two stage process whereby an inner core in the form of a bush 26 shown in FIG. 6 is formed by clamping two identical half segments 27 and 28 are clamped together by snap-on engagement. Each half segment 27,28 includes a pair of opposed flanges 29 and 30. Male flange 29 includes downwardly depending protrusions adapted to engage with apertures set in the underside of female flange 30. Accordingly, a single dye may be used to manufacture the bushes 26. The bushes 26 may include lateral or longitudinal ribs extending radially or outwardly from the bush surface 31 to ensure good interference with the tire material to be molded thereon. The bush 26 is made from nylon 66 which material has good wear resistance, strength and rigidity properties.

The polyaxled ring 20 bearing the assembled bushes 26 is inserted in an injection molding machine having dye cavities defining the shape of the tire component 32 of the roller 25. Polyurethane material having good tacky (gripping) and low noise properties together with relatively good wear resistance properties is injected into the dye cavities to form the tire components 32 around the bushes 26. The ribs referred to in relation to FIG. 6 assist in ensuring that the tire component 32 does not peel off the bush after extended wear. The rollers 25 are barrel shaped, having a larger central diameter than the diameter of the end portions thereof.

Figure 8:
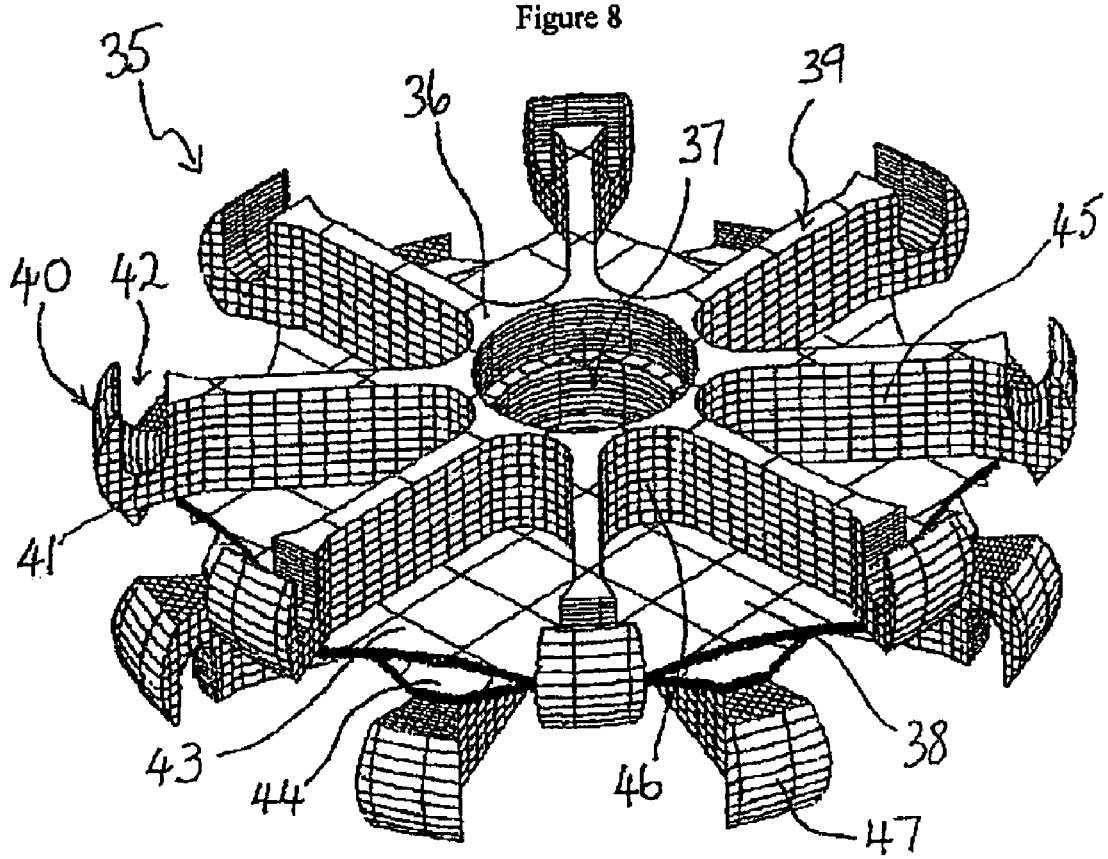
FIG. 8 is a perspective view of a wheel frame of the third embodiment.

In FIG. 8 there is shown a wheel frame 35 which may be integrally formed or made may be assembled from separately formed components. As shown in FIG. 8, the wheel frame 35 may comprise two identical first and second halves 43,44 respectively bearing the first and second supports according to the invention. The first and second halves 43,44 may be lockably engageable by snap-fit, non-releasable couplings configured to ensure the first and second halves 43,44 assume the required staggered configuration of the completed wheel frame 35.

The wheel frame 35 includes a central hub 36 defining a central bore 37. The wheel frame 35 includes a central disk 38 on which is mounted on either side eight arms 39 extending radially outwardly from the central hub 36 and terminating in first and second supports in the form of heads 40 extending just beyond the central disk 38.

The arms 39 integrally molded with the disc 38 each include a narrow, high-walled central shaft 45 joined to the central hub 36 by curved wall sections forming bridge portions 46. The curved wall configuration of the bridge portions 46 spreads the load borne by the central hub 36 and reduces the stress concentrations which would otherwise be applied to the bridge portions 46. The load is transferred from the roller 32 through the polyaxled ring 20 to the head 40, through the shaft 45 to the bridge 46 and then to the main axle.

The head 40 includes a seat 41 having a mouth facing outwardly in a direction parallel to the axis of the central bore 37 and defining an axial recess 42 adapted to receive the corner portions 22 of the polyaxled ring 20. The heads 40 each diverge from the shaft 45 to substantially fill the gap between adjacent rollers 32 in the same series. The head 40 presents an outer surface 47 which lies substantially flush with the end portions of the rollers. This may facilitate the protection of the roller mounting means from physical damage and may reduce the amount of dust and debris which would otherwise tend to collect in the mounting means.

As shown in FIG. 9, the completed wheel may be assembled by pressing the corner portions 22 into the corresponding axle recesses 42 on either side of the wheel frame 35. The corner portions 22 are then heat sealed in the recesses 42 to complete a stable structure.

In use, the wheel 50 is mounted to a main axle (not shown) extending wholly or partly through central bore 37 such that wheel 50 is capable of rotating about the axis of central bore 37. The article to which the wheel 50 is to be mounted, such as a supermarket trolley (not shown), either has a pre-existing bore to receive the main axle or a receiving bore is formed therein. The main axle is fixedly mounted in the receiving bore in the supermarket trolley such that the lowermost portions of the wheel 50 extend downwardly beyond the lowermost portion of the supermarket trolley. Typically, four such wheels 50 are so mounted to the supermarket trolley. In practice, the combination of the rotation of the wheel 50 about the main axle and the rotation of the rollers 25 contacting the ground enable the supermarket trolley to travel in any direction, whether straight ahead in which only rotation of the wheel 50 about the main axis is involved, transverse movement involving only the rotation of one or more rollers 25 or a combination of rotation of the wheel 50 about the main axle and rotation of one or more rollers 25 to enable diagonal travel.

SECOND VERSION DESCRIPTION

In describing the following embodiments of FIGS. 10-18, where convenient, like features will be referred to with reference to like reference numerals.

In FIG. 11, there is shown part of a first wheel 10 which part consists of a frame 11 which includes a central hub 12 defining a bore 13 for a main axle 6 (see FIGS. 14 and 15).

Extending radially out from the hub 12 is a plurality of evenly spaced radial arms 14 terminating in diverging head portions 15. The head portion 15 include internal walls 22 which follow the diverging curve of the head portions 15 so that the walls 22 of adjacent radial arms 14 present opposed, square-on faces between which the cylindrical roller axles 16 extend. Extending between each adjacent pair of head portions 15 is a roller axle 16 represented by broken lines. Each roller axle 16 is substantially solid, cylindrical and of a consistent cross section along its length. However, at each end 17,18 of the roller axle 16, the ends 17,18 are radially spread to ensure that a roller 30 (see FIG. 15) mounted thereon.

The frame 11 of wheel 10 accordingly includes the integrally formed hub 12, radial arms 14 and roller axles 16.

After the frame 11 is integrally formed by an injection molding process, rollers 40 must be formed on or about the roller axles 16. In one arrangement this is done by attaching a temporary sleeve 20 (see FIG. 10) to the roller axle 16. The sleeve 20 material may be any easily selectively degradable material able to withstand the injection molding process. For example the sleeve 20 may be made from a thin polymer film which is dissolvable in a solvent in respect of which the frame 11 and rollers 40 are stable. The sleeve 20 may include a line of adhesive 21 whereby to attach the sleeve 20 to the axle 16. Preferably, the sleeve 20 is made from thin material to minimise play between the roller 40 and the roller axle 16. Once the sleeve 20 is attached, the process involves surrounding the sleeve 20 and axle 16 with a two-part roller die (not shown). The roller die and the temporary sleeve 20, therefore, define the shape of the roller 40 formed therein. Preferably, the means of formation of the roller 40 are by injection molding into the roller die. The roller die may comprise one part which fits complementarily of the top side of the frame and a second part for the underside of the frame 11. The temporary sleeve 20 may then be selectively removed by a solvent in respect of which the frame 11 and the roller 40 is stable. In this arrangement, the roller 40 comprises a particularly hard material adapted to freely rotate about the roller axle 16 when under load.

A more preferred arrangement involves the attachment to the roller axle 16 of a permanent bush 19 adapted to rotate coaxially about the roller axle 16 with minimal free play. The flared ends of the roller axle 16 ensure that the bush 19 remains centrally located on the roller axle 16 and does not permit the bush 19 to or the roller tire 41 injection molded thereon to interfere with the head portion 15.

As best seen in FIG. 13, the bush 19 includes a pair of identical halves 23,24 joined along mutually adjacent edges by a hinge 25 in the form of a thin elongate strip of material. The component parts 23,24 and the hinge 25 are preferably integrally formed in a single process. However, it will be noted that the halves 23,24 are identical and can be formed using the same dye. In such an arrangement, the halves 23,24 are formed separately without a hinge and are joined by mechanical means. In the embodiment shown in FIG. 13, the hinged halves 23,24 include complementary male and female engagement means 26,27 whereby the bush 19 may be wrapped around a roller axle 16 and clipped together by the operation of the male and female engagement means 26,27 to form a cylindrical sleeve wrapped around the roller axle 16 but free to rotate thereabouts.

The bush 19 includes surface features, such as the annular band 28 to assist the adhesion of the roller tire 41 material to the bush 19. The surface features may include ridges, grooves, hooks and ledges, etc which extend laterally as shown with feature 28 or randomly longitudinally or diagonally or a combination of all of the above. The surface features may therefore include random features, such as random nodules or protrusions. The bush 19 is preferably made from an extremely strong material, such as acetal resin, and preferably is made from rigid plastics material.

The frame 11 may be made from a range of materials such as polypropylene or high density polyethylene, optionally reinforced by additives such as mica or glass. However, it is preferred that the frame 11 be made from a particularly strong and rigid material such as nylon 66.

Accordingly, the wheel 10 may be formed by first integrally molding a frame 11, attaching a plurality of cylindrical bushes 19, inserting the frame 11 and bushes 19 in a die defining a corresponding plurality of roller tire cavities, injection molding the roller tires 41 using a suitable material, such as polyurethane, and removing the dies after a suitable cure time resulting in a finalise wheel 10 product. The wheel 10 may be used in applications requiring support of articles of light load where the edge of a roller 40 making ground contact is satisfactory for the purpose.

The frame 11 further includes engagement means for attaching the frame 11 to another frame of like construction. Accordingly, the frame 11 includes studs 29 extending normal to the general plane of the wheel 10 which are engageable in an interference fit with corresponding recesses 30 best seen in FIG. 12. Of course, it is possible to produce a frame 11 with studs 29 on one face of the frame and recesses 30 on the opposing face. However, in the embodiment shown, the studs 29 are formed on one frame 11 and the recesses 30 are formed on a second frame 50 of different construction with regard to this aspect but the same as frame 11 in relation to other aspects. To combine the frames 11 and 50, the studs 29 and recesses 30 are lined up in registration and the studs 29 are inserted into the recesses 30. It will be noted that the studs 29 are located intermediate adjacent radial arms 14, whereas the recesses 30 are located in line with the radial arms 14. The studs 29 and recesses 30 may be fixedly secured to one another by a number of means. For example, the engagement means may involve a simple interference fit. However, preferably additional engagement means are provided in the form of adhesives, pressure welding or heat welding.

Preferably, the additional engagement means involves ultrasonic welding to ensure a strong bond is formed between the studs 29 and recesses 30. It will further be noted that the studs 29 are inset within the profile of the frame 11 whereas the recesses 30 extend proud from the frame 50. Accordingly, when the frames 11, 50 are fixedly secured to one another, the opposing faces of the respective hubs 11 abut together in solid engagement.

As seen in FIGS. 14 and 15, the frames 11,50 in combination form a wheel 60, each frame 11,50 having a series of rollers 40 regularly spaced around a rim portion 31 comprising two rims 32,33. Each of the rims 32,33 have a series of rollers 40 regularly spaced around the rims 32,33. The rollers 40 are rotatable about a roller axis transverse to the main axis 6a of the main axle 6.

The rim portion 31 is spaced apart from the central hub 12 by the radial arms 16. The radial arms 16 extend from the central hub 12 to the rims 32,33 and are formed in two parallel planes to form two parallel parts 34,35 of the wheel 60.

Each of the rollers 40 as seen in side elevation is in the shape of a by-truncated ellipse having a larger diameter in the middle than at its respective ends. Considerable overlap is provided between diagonally adjacent rollers 40 when viewed from the side elevation of the wheel 60. This is particularly important as the utility of the wheel 60 depends on good ground contact being made by the middle portion of the roller 40 when travelling in a direction transverse to the main axis 6a, particularly for applications such as the support of heavy loads, as opposed to single frame 11 applications described with reference to the wheel 10 in FIG. 11.

It is seen that the rollers 40 on the two rims 32,33 in combination present a twin rim 31 having a substantially continuous circular profile. This circular rim 31 profile enables the wheel 60 to provide a smooth rotation over the ground travelling in a direction transverse to the main axis 6a and relatively smooth travel in directions parallel to the main axis 6a. Moreover, the combined effect of the circular rim 31 profile, together with the large diameter of the two parts 34,35 and the substantial overlap between diagonally adjacent rollers 40, provides the wheel 60 with relatively smooth travelling directions parallel to the main axis 6a. The rollers 40 are formed onto the corresponding bushes 19 which extend between adjacent ends of the axial arms 14 as sleeves rotatably mounted around the corresponding roller axles 16. A roller tire 41 is applied to the bush 19 and is therefore able to rotate about the roller support corresponding to the roller axle 16.

During manufacture, the two parallel parts 34,35 are formed in integral pieces by injection molding. The integral parts include the central hub portion 12, the radial arms 14 and the roller supports 16. Complementary protrusions 29 and recesses 30 are formed in the respective hub portions 12 of frames 11,50 as seen in FIGS. 11 and 12 respectively. It is seen that the bisecting part line 36 of injection molding is through the centre of each of the parts 34,35 along a line corresponding to the general plane of each of frames 11,50 normal to the main axis 6a. The roller supports 16 are integrally molded with the radial arms 14 and the central hub 12 during the molding process whereby to separately form the frames 11,50 during the molding process. The hinged bushes 19 are then applied to the roller supports 16. The bushes 19 which are formed in halves are clipped around the roller supports 16 of each part 34,35. The parts 34,35 are then inserted into another mold and tire material is injected onto each bush 19 to form the rollers 41. The two parts 34,35 complete with rollers 40 attached thereto, are joined by the engagement of the studs 29 and the recesses 30 and are ultrasonically stud-welded together completing the wheel 60.

In FIG. 16, the structure and the wheel 60 is shown in greater detail. The respective frames 11, 50 are ultrasonically welded together following the engagement of the studs 29 with the recesses 30 to form a very strong and rigid bond. The rollers 40 are seen in cross-section showing the roller support, (roller axle 16), the bush or sleeve 19,20 and the roller tire 41.

Another embodiment of a wheel according to the invention is shown in FIG. 17. The wheel 70 includes a frame 71 in which the hub 72 and radial arms 74 includes no engagement means to combine with a second frame. Accordingly, frame 71 is useable as a single framed wheel like that of wheel 10 according to the invention. In the drawing, the bushes 73 are shown already attached to the frame 71.

In FIG. 18, there are shown another frame 80 including both male and female engagement means 81,82. Accordingly, in this embodiment, only a single frame 80 need be manufactured and may be used in a single framed wheel, a double framed wheel, a triple framed wheel, etc., according to the application.

In terms of suitable materials for each of the components, it has been found that the preferred materials are as follows: Nylon 66 for the frame 11,50,71 including the hub 12,72, radial arms 14,74 and roller axles 16, acetal for the bushes 19 and polyurethane for the roller tires 41. However, the person skilled in the art will appreciate that many other materials may be suitably used to achieve a workable wheel particularly adapted to the application intended. In some cases, particularly where heavy loads are anticipated, some components of the wheel 10,60 may be replaced with metal components, such as steel, preferably stainless steel. In particular, the frame 5,50, 71 may be made from stainless steel in applications where particularly heavy loads are anticipated. Where noise levels are an issue, such as in shopping centres and offices, the roller tires 41 are preferably made of a soft material (such as a soft grade of polyurethane) to dampen the noise created, possibly sacrificing properties such as hardwearing and abrasion resistance for quieter performance.

THIRD VERSION DESCRIPTION

In FIGS. 19 to 26 there are shown a wheel 100 comprising three rings, series or rows of rollers 140, each roller row 150, 151, 152 aligned along, respectively, three separate planes parallel to one another and normal to a main axis 106a. Each row of rollers 150, 151, 152 is supported on a wheel frame 111. The wheel frame 111 includes a central hub 112 from which a plurality of radial arms 114 extend, the radial arms 114 each terminating in a head portion 115, the head portions 115 supporting roller axles on which the rollers 140 are rotatably mounted. The roller axles 116 of each row 150, 151, 152 lie in one of the separate planes 160a, 160b, 160c. Each roller axle 116 is aligned along a roller axis 117 normal to the main axis 106a, non-coaxial and non-parallel to its adjacent neighbouring roller axles in the same plane 160a, 160b, 160c and normal to a theoretical line 116a extending radially from the main axis 106a. Of course, the theoretical line 116a for each roller 140 is different to that of the other rollers 140.

The wheel frame 111 further includes a disc 138 co-axial with the main axis 106a and preferably integrally formed with the radial arms 114. The outer radial extent of the disc 138 is defined by a circumferential rim 139. Accordingly, the fundamental structure of the wheel frame 111 is strong and rigid due to the reinforcing achieved by the combination of central hub 112, the disc 138, the radial arms 114 and the rim 139. The wheel frame 111 may be integrally formed in a manner similar to that of the wheel frame described with reference to FIGS. 1 to 9, but preferably the wheel frame 111 is formed by the joining of discrete, separately formed wheel subframes 160, 161, 162, corresponding to roller series 150, 151, 152, respectively.

The central subframe 161 is best shown in FIGS. 23-26. As clearly shown in FIG. 25, each roller head 115b is bi-symmetrical with reference to the plane 160b along which the subframe 161 is aligned. This is a significant design difference compared to the outer subframes 160, 162 as will be described below.

In one embodiment shown in FIGS. 23-26, the central hub 171 of the middle subframe 161 defines a substantially cylindrical bore 181 and a pair of axially aligned channels 183, 184. The axial channels 183, 184 allow a shaft, spindle, axle or bearing having complementary axially aligned protrusion or ridge to be received within the central bore 181 non-rotatably relative to the central wheel frame 161. The axial alignment of the engagement feature 183, 184 allows a complementary shaft (not shown) to be slidingly engaged within the central bore 181 and secured axially (against axial displacement) by means familiar to those skilled in the art, such as industrial strength adhesive (eg. epoxy resin), friction fit or other physical features designed to abut against the outwardly facing wall of the central hub 171. In this embodiment, the central hub 171 is press-fitted to the shaft, etc. The channels are offset 120° relative to one another so that adjacent subframes 160,161,162 can be offset 120° relative to one another to achieve an indexed symmetrical overlap of diagonally adjacent rollers by running the ridge or protrusion through one channel 183 or the other 184.

As person skilled in the art will appreciate, the axially aligned keys 183, 184 may vary in shape and configuration whilst still achieving another of the functional aims of resisting rotation about the main axis 106a of the wheel frame 161 relative to the inserted shaft, etc. For example, the keys 183, 184 may be reduced to a single longitudinal slot, they may be other than channel shaped, for example semi-cylindrical or triangular in cross-section, and so on. The longitudinally arranged keys 183, 184 may be oriented relative to one another other than at 120° relative to the main axis 106a and may be in ortho and para positions (borrowing stereochemistry terminology), as well as the meta position shown. In particular, the keys can be positioned to achieve a certain predetermined amount of overlap. However, it is preferred that there be at least two axially aligned keys, such as three keys axially aligned relative to the main axis 106a and oriented 120° relative to one another. The provision of at least two axially aligned keys better resists the torsional or twisting forces that may be applied by the shaft, etc. relative to the central wheel frame 161 whereby to spread the load of such forces to better maintain structural integrity of the central wheel frame 161.

In another application of the central subwheel 151, the wheel 151 is used in combination with other like wheels 151, spaced along on axle shaft to support an industrial structure. For example, a plurality of parallel rods are arranged so that they support a plurality of wheels spaced evenly in a grid arrangement. Rigid, planar objects such as glass panels may be movably supported on the grid of wheels. The panel may be moved in any direction in its plane by the multidirectional action of the supporting roller wheels. The axles or shafts have one corresponding longitudinal ridge extending along each of their lengths. The wheels may therefore be offset 120° relative to one another being alternatively mounted along one or other of the axial slots 183,184 in their respective hubs 171. The subwheels 151 may therefore be grouped in pairs or triplets with adjacent subwheels 151 in each group offset 120° relative to one another. This provides a useful alternative to airbeds for supporting such panels and requires no additional energy and less maintenance than a conventional airbed. The rollers 140 can be made from a soft, low-impact material such as polyethylene to suit fragile items such as glass or other brittle panels.

In another alternative use of subwheel 151, the subwheels may be used on a conveyor line as the supporting structure along which items such as boxes, etc. may proceed. The plurality of subwheels 151 beneficially positioned at corners or bends as the item is guided in a new direction by rails etc. The plurality of subwheels 151 may freewheel, rotating about axles forming part of the conveyor. Alternatively, the subwheels 151 may be driveably mounted on the axle which, in turn, is driven, for example, by am electric motor or other motor suitable for driving a conveyor. The axles may be aligned transverse to the direction of travel of the box, although this is not critical because the subwheels 151 will permit travel of the box in any direction. The axles are preferably generally aligned parallel and have two or more subwheels spaced along their length thereon.

In a preferred embodiment shown in FIG. 28 with reference to FIG. 20, the central hub 171 of the middle subframe 161 is substituted with an inner rim 161 a comprising substantially less material than the middle subframe 161. The inner rim 161 a defines a large circular aperture 181 a that does not come in contact with the main axle extending therethrough. Instead, the main axle is a plain cylindrical body press fitted or otherwise secured in the outer wheel's 150,152 central hubs 112a, 112c against rotation relative to the wheel frames 160, 161,162. The central subframe 161 is prevented from rotation relative to the outer casing 195 of the bearing by virtue of its rigid attachment to each of the subframes 160,162 flanking it. The inner rim is substantially thinner than central hub 171, but its outer wall is generally of a similar diameter to that of central hub 171 whereby the fundamental design of the disc 138, the intermediate rim 139 and the engagement means 129,130 are retained. Without any material compromise in strength, this enables the production of a wheel that has minimal weight and cost.

The length of the central hubs 171 in an axial direction is greater than the widths of the inner rim and the intermediate rims 139 and is complemented by recesses in the facing subframes of the outer subframes 160,162 (see, for example, the central recesses FIGS. 17 and 18 adapted to received the proud central hubs 171). Alternatively, the surfaces of the central hubs 170,172 facing inwardly are substantially flush or coplanar with the corresponding surfaces of the radial arms 114 intermediate the intermediate rim 139 and the central hubs 170,172 as shown in FIGS. 11 and 12, whereby fixed engagement is achieved by the protrusions 129 and cooperating recess-containing pillars (see 130 in FIG. 12).

Referring again to FIG. 19, it can be seen that the head portions 115a, 115c of the outer wheel frames 160, 162 are not bi-symmetrical along their respective subframe planes 160a, 160c, but are biased away from the central series of rollers 151. This enables the wheel frame 111 to be of generally smaller and compact construction whilst making no material compromise in relation to the structural strength and integrity of the overall wheel frame 111. As described with reference to FIGS. 11-18, the separately formed wheel subframes 160, 161, 162 are preferably separately formed and joined together by anyone of various means, preferably ultrasonic welding. To this end, on both faces of the disc 138 of the middle subframe 161 there is provided outwardly extending studs or cylindrical protrusions 129 adapted to be received in complementarily shaped apertures such as those shown in FIG. 12 with reference to feature 30. The studs 129 and apertures 30 are arranged offset relative to one another relative to the radial arms 114 whereby to ensure the correct positioning of the rollers 140 relative to their diagonally adjacent neighbours in the adjacent series of rollers.

The central hubs 112a, 112c of the outer wheel subframes 160, 162 extend proud of the outer surface of the respective disc 138 and the central bore 180 defined by the outer central hubs 112a, 112c are plain cylindrical bores. It will be appreciated, that the entire wheel frame 111 resists twisting and torsional stresses as well as rotation about the main axis relative to the outer surface of the shaft, or as shown in FIG. 20, the outer casing of a bearing 195, by virtue of keys 184, 184.

Although, wheel performance generally requires that the frame 111 be rigid and substantially inflexible to minimise instability of the wheel structure, it may be advantageous in some application to permit minimal flexing. By providing a hollow central core of central subframe 161, the central series of rollers may depress axially inwardly under load whereby to increase, marginally, the load on the ground-contacting outer series of rollers 150, 152. The load on a single central series of rollers 151 can therefore be reduced in favour of the pair of outer rollers 150 152. In contrast, where the outer series of rollers are provided with slightly outwardly extending supports 115 that are capable of slight flexion, when load is placed on one side of the wheel, i.e. on roller series 150 or roller series 152, the side most roller under greatest load may flex slightly to unevenly permit a slight redistribution of load to the central row of rollers 151. This arrangement can improve rolling performance in directions having a component parallel to the main axis 106a.

It will be appreciated that a fourth or even fifth row of rollers may be added to a wheel to increase stability and capacity for load bearing, depending on the particular application. In this respect, the inner rows of rollers will be supported by wheel subframes having complementary engagement means suitable to engage with the outer wheel subframes 160, 162 and or one or more inner wheel subframes. Alternatively, the inner wheel subframe may be integrally formed as described in FIGS. 1-9 varying multiple rows or series of supports on which may mounted corresponding multiple series of rollers. In such an arrangement, the outwardly facing engagement means of such a wheel subframe may comprise the protrusions 129 as shown in FIG. 23.

With reference to FIGS. 27a to 27c, it can be seen that various overlapping arrangements are possible according to the invention. Provided that there is at least 10% overlap between at least one diagonally adjacent roller of a three (or more) row wheel, the lateral travel of the wheel in directions having a component parallel to the main axis may be sufficiently smooth. In FIG. 27a, a roller 40a has about 70% overlap with one diagonally adjacent roller 40b in an adjacent series, but no overlap with the next roller 40c in the same series as the roller 40b. Nevertheless, even when the ground contacting line corresponds to line A, the load on the wheel will mainly be on rollers 40d in the first and fourth series of rollers, thereby maintaining good lateral roll for the wheel.

In FIG. 27b, there is shown the conventional roller arrangement in which the rollers 40e overlap with diagonally adjacent rollers to the extent of at least 10% of the length of the relevant roller. In FIG. 27c, the overlap is about 50% between each roller 40f and at least one diagonally adjacent roller 40g whereby good ground contact may be made at least one roller, whether the ground contacting line is at B, C or D.

In FIG. 28 there is shown an inner subframe 161a in which an inner rim defines a large central bore 181 a adapted to receive an axle, bearing, shaft or the like without contacting same. The provision of a large central bore as opposed to a contacting hub serves to lighten the overall wheel structure and can allow marginal flex in the subframe 161a under load to permit load redistribution to outer rollers in suitable applications where frame flexing can be tolerated. It should be noted, however, that stiff materials that retain their rigid properties at standard temperatures (−10° to 100°) and when subjected to loads up to 0.5 ton per cm² are desirable. Such materials include acetal and steel and any other suitable strong and rigid materials.

By way of example, in relation to the three-body wheel embodiment shown in FIG. 19 having an acetal frame and polyurethane rollers, a crush test was conducted in a hydraulic press. It was found that a load less than 3 tonne exerted on the circumference of the wheel 100 supported on "vee blocks" with a shaft through the centre resulted in no detectable deformation of the frame 111. A 3 tonne load resulted in measurable deformation in the shape of the frame without failure whereby the wheel still performed satisfactorily.

When the pressure was increased to 4 tonne, the wheel 100 deformed in shape considerably such that it no longer performed satisfactorily, but the frame 111 did not fail or show signs of fatigue, fracture or irreversible deformation. Indeed, when the pressure was released, the wheel 100 and specifically the frame 111 returned to its original shape with no loss of functionality. If the centre body or inner frame included a hub directly mounted to the main axle, the wheel would be rigid and would definitely break. However, because the inner rim 161a defines a large circular aperture 181a that does not come in contact with the main axle extending therethrough, the frame 111 is permitted to flex and therefore withstand greater loads without structural, irreversible failure. The large bore 181a allows the whole wheel 100 to flex under heavy pressure.

It is seen that the manufacture of the wheel according to the preferred embodiment provides an improved manufacturing process which provides for a multiple directional wheel to be manufactured in an easy and efficient manner.

Throughout the specification and claims the word "comprise" and its derivatives are intended to have an inclusive rather than exclusive meaning, unless the context requires otherwise.

It will be appreciated by those skilled in the art that many modifications and variations may be made to the embodiments described herein without departing from the spirit or scope of the invention.

The invention claimed is:

1. A wheel rotatable about a main axis, including:
    (a) a frame including a plurality of supports;
    (b) at least two series of rollers, the first of said series of rollers aligned with a first plane normal to said main axis and spaced to form a first discontinuous rim; and
    (c) the second of said series of rollers radially spaced from the main axis and aligned with a second plane normal to said main axis, said second series of rollers spaced to form a second discontinuous rim, said first and second planes aligned parallel to and spaced from one another,
    each roller of said first and said second series of rollers being:
    (i) radially spaced from said main axis;
    (ii) rotatable about an axis normal to said main axis;
    (iii) mounted between a pair of said supports; and
    (iv) having a lateral central cross-sectional diameter greater than the diameter of its end portions,
    whereby, when viewed in side elevation, the effective ground contacting surface of each said roller of said first series of rollers overlaps with the effective ground contacting surface of at least one diagonally adjacent roller of said second series of rollers so that said wheel is adapted to make effective ground contact through at least two of said rollers at any one time for effective travel in directions having a component parallel to said main axis,
    wherein each roller of said first series of rollers is mounted on a continuous polyaxle ring, each roller axle length of said polyaxle ring having a linear axis and integrally formed with adjacent other axle lengths and extending between and through a first series of said supports.

2. A wheel according to claim 1, wherein said frame comprises two or more separately formed subframes joinable together to form a single composite wheel frame.

3. A wheel according to claim 2, wherein a first said subframe supporting said first series of rollers is integrally formed in a molding process and comprises a central hub, said first series of said supports and a first polyaxle ring.

4. A wheel according to claim 2, wherein a first of said subframes supports said first series of rollers and a second of said subframes supports said second series of rollers.

5. A wheel according to claim 4, wherein said subframes are joined by engagement means comprising complementary parts on said first and said second subframes.

6. A wheel according to claim 2, wherein said wheel comprises at least three series of rollers including two outer series of rollers and at least one inner series of rollers, one of said subframes is an inner subframe supporting one of said inner series of rollers and aligned with at least one corresponding inner plane normal to said main axis, said inner series of rollers spaced to form an inner discontinuous rim, and wherein, when said wheel is viewed in side elevation, the effective ground contacting surface of each said roller of at least one of said outer series of rollers overlaps with the effective ground contacting surface of the diagonally adjacent rollers of said inner series of rollers.

7. A wheel according to claim 6, wherein each of said series of rollers is rotatably mounted on one continuous polyaxle ring forming part of each corresponding said subframe.

8. A wheel according to claim 7, wherein said inner subframe comprises an inner rim about said main axis and at least one of said subframes comprises a hub about said main axis.

9. A wheel according to claim 8, wherein said inner rim has a central aperture with a diameter greater than the diameter of the bore defined by said hub to permit said frame to flex under high loads.

10. A wheel according to claim 7, wherein said inner subframe is capable of sufficient flexion to permit redistribution of load from the ground contact roller of said inner series of rollers to at least one roller of one of said outer series of rollers.

11. A wheel according to claim 8, wherein said wheel is mounted on a main axle extending through said inner rim and said hub and said main axle is not in physical contact with said inner rim.

12. A wheel according to claim 8, wherein said inner subframe including said inner rim is formed from substantially less material than said subframe with said hub.

13. A wheel according to claim 6, wherein the outer roller axle plane in which the outer roller axes of one of said outer series of rollers lies is not coplanar with the corresponding subframe plane in which said outer subframe supporting said outer series of rollers predominantly lies, whereby the rollers of said outer series of rollers are mounted on supports extending outwardly from said outer subframe plane to said outer roller axle plane.

14. A wheel according to claim 1, wherein said frame comprises a central hub and wherein, in use, said wheel is mounted to a main axle extending through a central bore of said central hub whereby said wheel is capable of rotating about said main axis, said main axis of fixed position relative to an article mounted on said main axle whereby said article may be caused to travel in any direction involving:
    (a) rotation of said wheel about said main axis;

(b) rotation of one or more of said rollers about their respective transverse axes; or
(c) a combination of rotation of said wheel about said main axis and rotation of one or more of said rollers about their respective transverse axes to enable diagonal travel relative to a direction of travel normal to said main axis.

15. A wheel according to claim 7, wherein each said subframe is integrally molded as a single piece.

16. A wheel rotatable about a main axis, said wheel including:
   (a) one or more inner series of rollers radially spaced from said main axis and aligned with an inner roller series plane normal to said main axis, each roller of said inner series of rollers circumferentially spaced to form an inner discontinuous rim;
   (b) a first outer series of rollers on a first side of said inner series of rollers, said first outer series of rollers radially spaced from said main axis and aligned with a first outer roller series plane, said first outer roller series plane aligned substantially normal to said main axis and said first outer series of rollers circumferentially spaced to form a first outer discontinuous rim; and
   (c) a second outer series of rollers on the other side to said first side of said inner series of rollers, said second outer series of rollers radially spaced from said main axis and aligned with a second outer roller series plane, said second outer roller series plane aligned substantially normal to said main axis, said second outer series of rollers circumferentially spaced to form a second outer discontinuous rim, and said second outer roller series plane substantially parallel to said inner roller series plane and said first outer roller series plane; and
   wherein
   (i) each said roller is rotatable about a roller axis:
      (x) lying in the plane, in which the series of rollers to which the roller belongs, lies;
      (y) normal to a theoretical line extending radially from said main axis through the plane in (x);
   (ii) each said roller has a central diameter wider than the diameter of its end portions;
   (iii) when viewed in side elevation, the effective ground contacting surface of each roller of said inner series of rollers overlaps with the effective ground contacting surface of the diagonally adjacent rollers of said outer series of rollers so that said wheel is adapted to make effective ground contact through at least two of said rollers at any one time for effective travel in directions having a vector component parallel to said main axis; and
   (iv) each of said series of rollers is mounted on a corresponding continuous polyaxle ring, each roller axle length of said polyaxle ring being linear and integrally formed with adjacent other axle lengths and extending between and through said supports.

17. A wheel according to claim 16, wherein each said polyaxle ring defines a hexagonal or octagonal shape.

18. A wheel rotatable about a main axis, including:
   (a) an integrally formed frame molded as a single piece and aligned with a frame plane normal to said main axis, said frame comprising
      (i) a central hub;
      (ii) a plurality of supports extending outwardly from said central hub and aligned with said frame plane; and
      (iii) a continuous polyaxle ring aligned with said frame plane; and
   (b) a race of rollers, aligned with said frame plane and spaced to form a discontinuous rim of said wheel, each said roller:
      (i) equally radially spaced from said main axis
      (ii) rotatable about an axis normal to said main axis;
      (iii) mounted between a pair of said supports oh a corresponding section of said polyaxle ring; and
      (iv) having a lateral central cross-sectional diameter greater than the diameter of its end portions,
   wherein said continuous polyaxle ring defines a polygonal shape, and each roller axle length of said polyaxle ring having a linear axis and integrally formed with adjacent other axle lengths and extends between and through said plurality of supports.

19. The wheel of claim 18, wherein each said support of said plurality of supports includes a radial arm extending from said central hub.

20. The wheel of claim 19, wherein said frame includes a substantially solid central disk coaxial with said main axle and formed between said central hub and said radial arms.

21. The wheel of claim 20, wherein said radial arms are in length less than half the radius of said wheel and greater than the diameter of each of said rollers.

* * * * *